(12) United States Patent
Young

(10) Patent No.: US 6,898,681 B2
(45) Date of Patent: May 24, 2005

(54) COMPUTER STORAGE SYSTEMS

(75) Inventor: Marcus C. Young, Headley (GB)

(73) Assignee: Sun Microsystems, Inc., Santa Clara, CA (US)

(*) Notice: Subject to any disclaimer, the term of this patent is extended or adjusted under 35 U.S.C. 154(b) by 139 days.

(21) Appl. No.: 10/188,599

(22) Filed: Jul. 2, 2002

(65) Prior Publication Data

US 2003/0005235 A1 Jan. 2, 2003

(30) Foreign Application Priority Data

Jul. 2, 2001 (GB) .............................................. 0116165

(51) Int. Cl.$^7$ .............................................. G06F 12/00
(52) U.S. Cl. ........................... 711/162; 714/6; 707/204; 711/114
(58) Field of Search ............................. 711/161, 162, 711/141; 707/204; 714/6

(56) References Cited

U.S. PATENT DOCUMENTS

| | | | |
|---|---|---|---|
| 5,649,196 A | | 7/1997 | Woodhill et al. ........... 395/620 |
| 6,035,412 A | * | 3/2000 | Tamer et al. ................... 714/6 |
| 6,061,770 A | | 5/2000 | Franklin ...................... 711/162 |
| 6,078,932 A | | 6/2000 | Haye et al. .................. 707/204 |
| 6,212,531 B1 | | 4/2001 | Blea et al. ................... 707/204 |
| 6,269,431 B1 | * | 7/2001 | Dunham ....................... 711/162 |
| 6,549,992 B1 | * | 4/2003 | Armangau et al. .......... 711/162 |

FOREIGN PATENT DOCUMENTS

WO     WO 01/48609 A1     7/2001

OTHER PUBLICATIONS

Lawrence, B. "Netware mirror with a twist." Mar. 1996 http://www.byte.com/art/9603/sec11/art5.htm.

Sarkar, P. "Instant image: Transitive and cyclical snapshots in distributed storage volumes." Proceedings of Euro–Par 2000, pp. 1284–1291 2000.

* cited by examiner

*Primary Examiner*—Kevin Verbrugge
(74) *Attorney, Agent, or Firm*—Lahive & Cockfield, LLP

(57) ABSTRACT

A system for providing a copy of data at a point in time, has: a data storage device including a master store arranged to store blocks of data, at least one subsidiary store to store point in time copy data having blocks of data copied from said master store at a particular point in time, and a bitmap store associated with each the subsidiary store to store data indicating when a data block of the master store differs from a corresponding data block stored in the associated subsidiary store. Where more than one subsidiary stores and associated bitmap stores are provided, a controller may make different point in time copies in different subsidiary stores. A number of master stores may also be provided, each associated with a corresponding subsidiary store and a bitmap store. In this case, the controller may ensure that point in time copies of all the master stores are made at the same point in time. Data from a master store may be stored in a subsidiary store only when it is to be replaced in the master store. In this case, the subsidiary store may be smaller in capacity than the master store and an overflow store may be provided for use when the subsidiary store is full.

65 Claims, 20 Drawing Sheets

Dependent Shadow initialisation.

Dependent Shadow after altering the master.

| Master | Virtual Shadow | Physical Shadow | Shadow Bitmap | Copy Bitmap |
|---|---|---|---|---|
| AAA | AAA | | 0 | 1 |
| BBB | BBB | | 0 | 1 |
| CCC | CCC | | 0 | 1 |
| DDD | DDD | | 0 | 1 |
| EEE | EEE | | 0 | 1 |
| FFF | FFF | | 0 | 1 |
| GGG | GGG | | 0 | 1 |
| HHH | HHH | | 0 | 1 |

Independent Shadow when master has been altered.

| Master | Virtual Shadow | Physical Shadow | Shadow Bitmap | Copy Bitmap |
|---|---|---|---|---|
| AAA | AAA | AAA | 0 | 0 |
| NEW | BBB | BBB | 1 | 0 |
| CCC | CCC | CCC | 0 | 0 |
| DDD | DDD | DDD | 0 | 0 |
| NEW | EEE | EEE | 1 | 0 |
| FFF | FFF | FFF | 0 | 0 |
| GGG | GGG | GGG | 0 | 0 |
| HHH | HHH | HHH | 0 | 0 |

COMPUTER STORAGE SYSTEMS

RELATED APPLICATION

This application claims the benefit of priority under 35 U.S.C. §119 to U.K. application Ser. No. 0116165.2, filed Jul. 2, 2001. The contents of the aforementioned application are hereby incorporated by reference.

FIELD OF THE INVENTION

This invention relates to systems for and methods of enabling creation of point in time copies of data stored in a computer storage system.

BACKGROUND TO THE INVENTION

Computer storage systems are usually provided on discs of some sort for example magnetic or optical discs. Permanent storage is normally provided on hard discs. These can range from the hard disc provided within a personal computer to multiple disc systems used on large networks of the type which might be used by for example banks.

In the case of hard disc systems, such as RAID (Redundant Arrays of Inexpensive Drives) devices, memory is divided into what are known as disc volumes. A disc volume may comprise a single disc, a subset of a single disc, or a number of discs, depending on the application in question. Each disc volume is treated by the computer system as a number of blocks of storage which are usually equally sized tracks (e.g. 32K bytes) wherein each track is a discrete addressable portion of the disc volume.

It is standard practice to make backups of data from disc volumes at regular intervals. These enable data to be recovered in the event of a system failure. Also, they allow some off-line analysis to be performed on data.

One of the drawbacks of backup copies is that they take a very long period of time to compile, this being dependent on the size of the disc volumes being backed up. Also during the time within which the backup is being compiled, some of the data may change. The backup will therefore be made with no knowledge of this.

It has been appreciated that in addition to the normal backup copy it would be useful to have a copy of a disc volume which is a true copy at a discrete point in time. This is known as a point in time copy.

At present, it is only possible to take a single point in time copy. The taking of a further point in time copy erases the earlier point in time copy. In some applications, multiple point in time copies would be useful so that data can be taken off-line and subsequently analysed, e.g. to look for trends in particular pieces of data. At present, it is necessary to download a copy point in time copy before a new one can be made and the download time may be longer than the interval required between point in time copies.

SUMMARY OF THE INVENTION

According to a first aspect of the present invention there is provided a computer memory storage system with a point in time copy function which enables multiple point in time copies to be taken of data stored by a master store, to be maintained independently of the master store, and to each be maintained independently of the other point in time copies.

In accordance with a second aspect of the present invention there is provided a point in time copying system wherein data is only copied from a master store to a point in time copy store when that data is about to be overwritten, overwrite data is stored indicating which data in the master store has been overwritten and a controller is operable, using the overwrite data, to create a point in time copy using any unchanged data in the master store and the data copied to the point in time copy store, wherein the point in time copy store has a smaller storage capacity than the master store and an overflow store is provided for storing data copied from the master store when the point in time copy store is full. This enables a small point in time copy store to be used because generally only some of the data in the master store will be copied to the point in time copy store while providing an overflow store, if required.

In an embodiment, an overflow store can be included which is shared between several point in time copy or shadow stores. When this is used in combination with the shadow stores the total required storage volume or capacity is less than the sum of the shadow store which would have been required in the absence of the overflow store.

Further advantages arise in being able to export point in time copies to separate locations for further analysis or processing and subsequently to import a modified point in time copy back to the original point in time copy system.

In accordance with a third aspect of the invention there is provided a point in time copy system in which a point in time copy may be exported to separate locations and subsequently reimported in modified form.

Still further in some applications, a plurality of master storage volumes are required for a single disc volume. This is likely to be the case for example in large database applications. In such cases, it is desirable to be able to take a point in time copy of all the volumes at once. The volumes may additionally be spread across a number of physical discs.

In accordance with a fourth aspect of the present invention there is provided a computer memory system with a point in time copy function in which a plurality of volumes are grouped together as a single logical device and a point in time copy produced for the logical device.

BRIEF DESCRIPTION OF THE DRAWINGS

Embodiments of the present invention will now be described, by way of example, with reference to the accompanying drawings, in which like reference numerals refer to like elements and in which:

FIGS. 8a and 8b show tables for illustrating creation of a point in time copy in the independent mode and for illustrating the effect of a change to data stored in a master store of a mass storage device;

FIG. 15b shows a table for explaining creation of a point in time copy by the point in time copy system shown in FIG. 15a;

DETAILED DESCRIPTION

Figure 1:
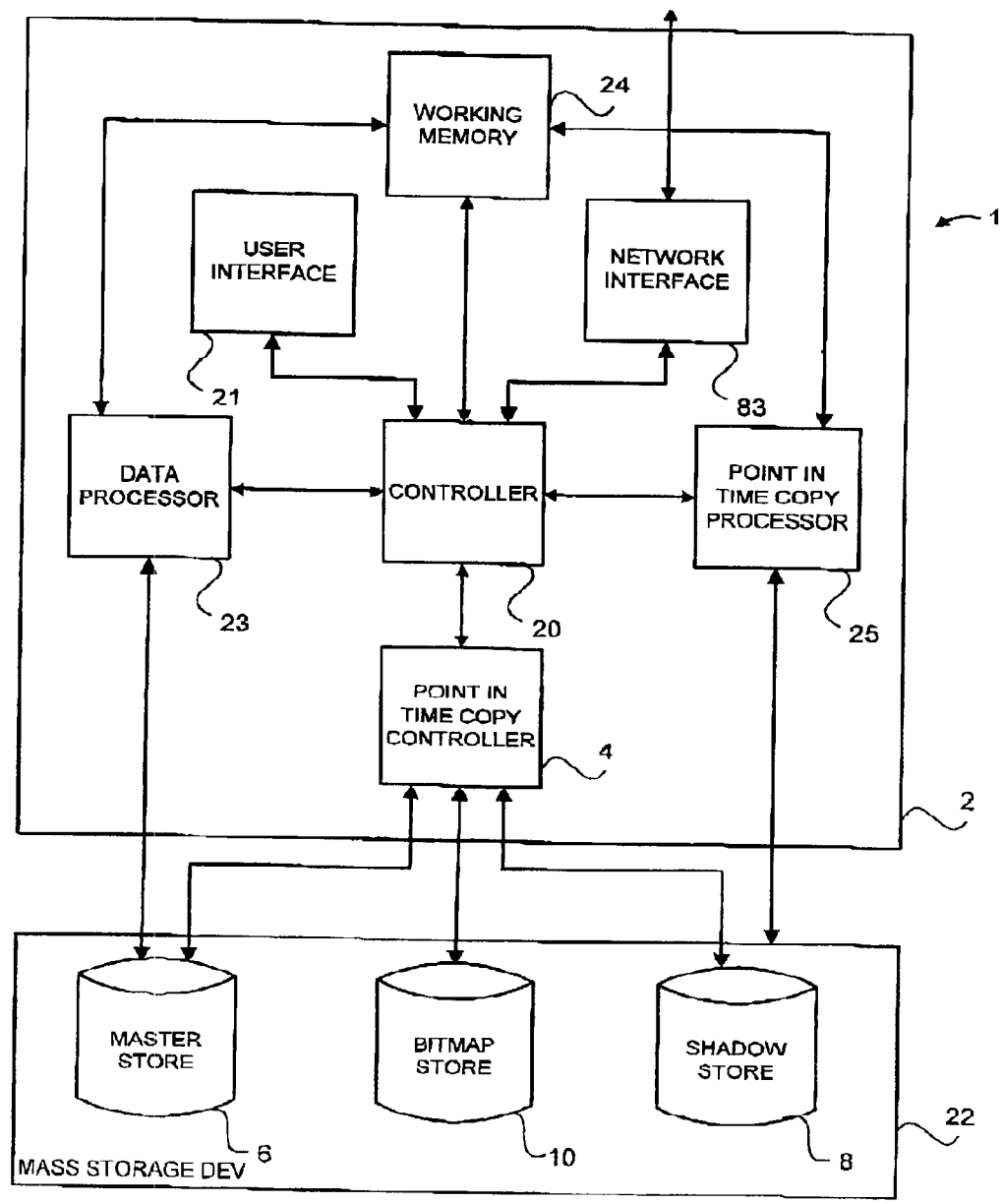
FIG. 1 shows a functional block diagram of a point in time copy system comprising a host computer and a mass storage device.

As shown in FIG. 1, a point in time copy system 1 comprises a host computer 2 and a mass storage device 22.

The host computer 2 comprises a controller 20 for controlling overall operation of the host computer, a user interface 21 for enabling communication with a user and input of instructions by a user, a data processor 23 for processing data, a working memory 24 for storing data to be processed by the data processor 23 and/or the controller 20 and, in the example shown, a network interface 83 for enabling the host computer 2 to communicate with other computing apparatus over a network such as a local area or wide area network, the Internet or an Intranet.

In addition, the host computer includes a point in time copy controller 4 for controlling creation of a point in time copy. The point in time copy controller 4 provides a communication layer between the host computer and the mass storage device 22. In this example, a point in time copy processor 25 is also provided for enabling subsequent processing to be carried out on a point in time copy.

The mass storage device 22 is divided into a number of different memory areas or stores which may or may not be provided on physically separate mass storage devices. For example, the mass storage device 22 may comprise one or more mass storage units such as an array of hard disc drives, for example RAID devices. In the example shown in FIG. 1, the different memory areas comprise a master store 6 that provides a mass storage area for storing data blocks representing a master copy of a file, and a shadow or subsidiary store 8 and a bitmap store 10 for storing point in time copy data. Where the mass storage device 22 comprises a hard disc system or array, then the master store 6, shadow store 8 and bitmap store 10 will be separate disc volumes and generally the data blocks will be separate hard disc drive tracks. Usually, the blocks of data will be of uniform size.

Figure 2:
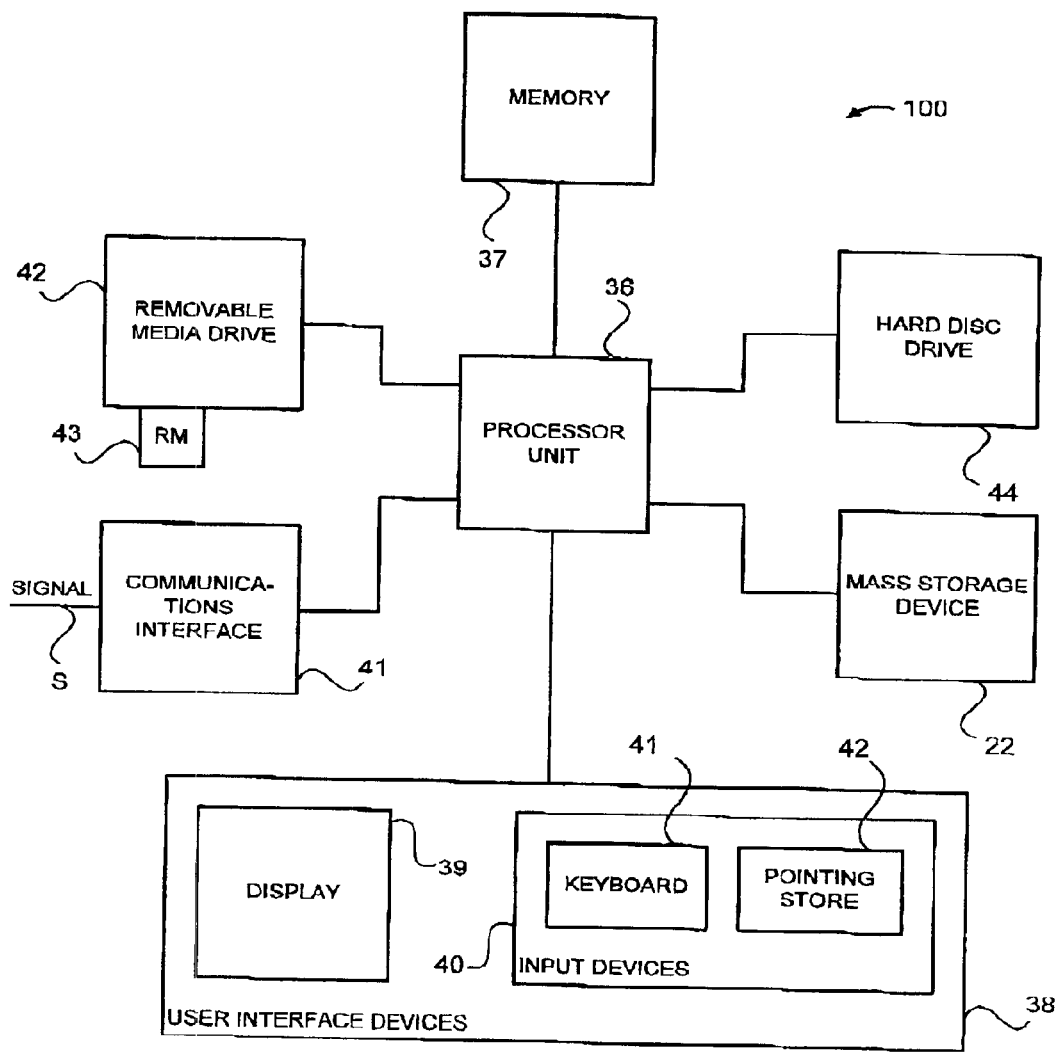
FIG. 2 shows a functional block diagram of computing apparatus that may be programmed by program instructions to provide the host computer shown in FIG. 1.

FIG. 2 shows a functional block diagram of computing apparatus 100 coupled to the mass storage device 22 and programmable by program instructions to provide the point in time copy system shown in FIG. 1. As shown in FIG. 2, the computing apparatus comprises a processor unit 36 with associated memory 37, generally random access memory (RAM) and possibly also some read-only memory (ROM). The computing apparatus also includes a removable media drive 42 for receiving a removable medium 43 and user interface devices 38 in the form, as shown, of a display 39 such as CRT or LCD display and user input devices 44 which will usually comprise a keyboard 41 and a pointing device such as a mouse or touch pad 42. A hard disc drive 44 is provided on which program instructions and data may be stored. The computing apparatus 100 also includes a communications interface device 41 such as a MODEM and/or network card arranged to enable communication over a network with other computing apparatus.

The computing apparatus 100 may be, for example, a file server on a network that is arranged to store in the master store 6 files that can be accessed by other computing apparatus over the network, that is the host computer 2 will be arranged to organize storage requirements in the mass storage device 22 for users of the network.

The computing apparatus shown in FIG. 2 may be arranged to operate in accordance with the Sun Microsystems Solaris (Trade Mark) operating environment and may be programmed to provide the point in time copy system by program instructions provided in any one or more of the following ways:

1. pre-stored on the hard disc drive 44 or in a non-volatile portion of tho memory 37;
2. downloaded from a removable medium 43; and
3. supplied as or carried by a signal S via the communications interface device 41.

This point in time copy system is based on the Sun Microsystems Sun StorEdge (Trade Mark) Instant Image system that is configured to operate in either an independent or a dependent mode.

In the independent mode, when a point in time copy is created, the shadow store 8 contains a copy of each block of data that was present in the master store 6 at the time the point in time copy was made. In contrast, in the dependent mode the shadow store 8 contains copies of only those blocks of data that were about to be changed while or after the point in time copy was made and the full point in time copy is assembled from the copies of the blocks of data stored in the shadow store and the unchanged blocks of data present in the master store.

In each case, the point in time copy system makes use of a shadow bitmap stored in the bitmap store 10 which comprises a single bit for each block of data stored on the master store. The bitmap store 10 also stores a copy bitmap which, like the shadow bitmap, includes a single bit for each block of data stored by the master store 6.

Operation of the point in time copy system in the dependent mode will now be described with the assistance of FIGS. 3 and 4a to 4f.

Figure 3:
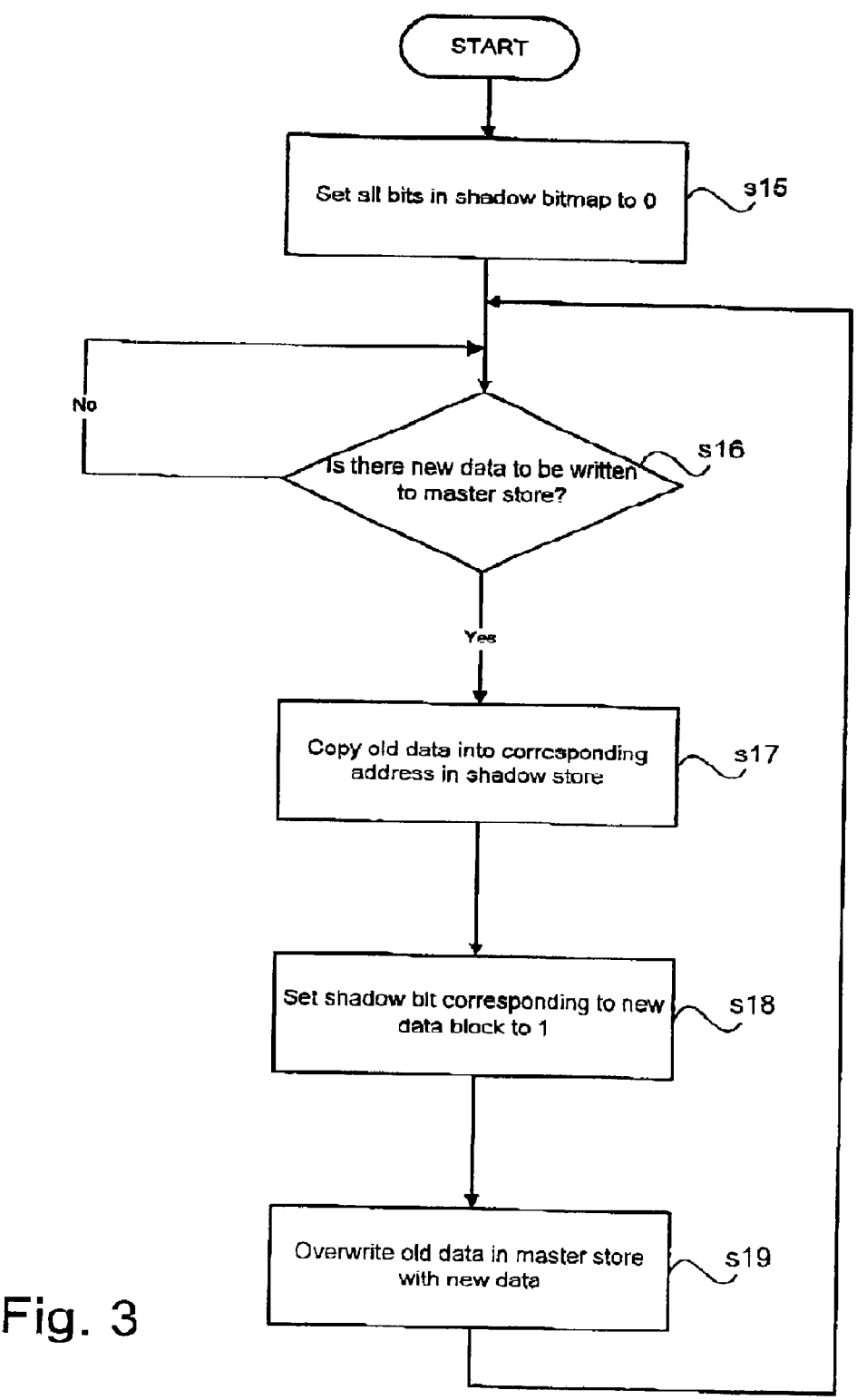
FIG. 3 shows a flow chart for illustrating operation of the system shown in FIG. 1 in a dependent mode.

FIG. 3 shows a flow chart illustrating operations carried out by the point in time copy system in the dependent mode.

FIGS. 4a to 4d show diagrams illustrating in a simplified manner changes in state in the master store 6, shadow store 8 and shadow bitmap 10a during the creation and maintenance of a point in time copy in the dependent mode. For simplicity in FIGS. 4a to 4d, the master store 6 and shadow store 8 are represented as having only three data blocks (with the three data blocks in the master store 6 being shown as A, B and C) and the shadow bitmap 10a having three corresponding bits. The diagonal lines in the shadow store 8 in FIGS. 4a to 4d represent the fact that the data block is empty.

Figure 4A:
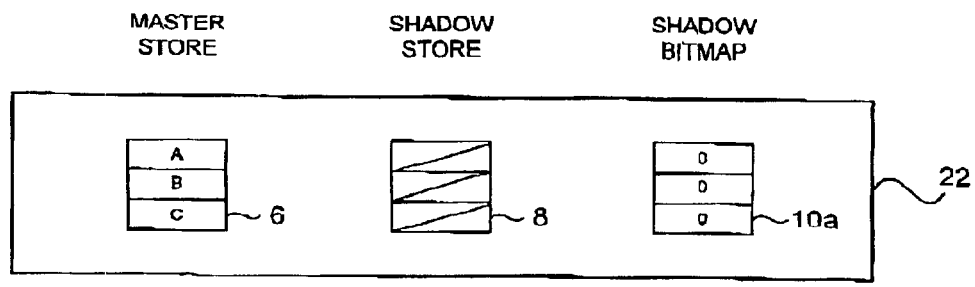
FIGS. 4a to 4d show diagrams for illustrating stages in the obtaining of a point of time copy in the dependent mode.
Figure 4B:
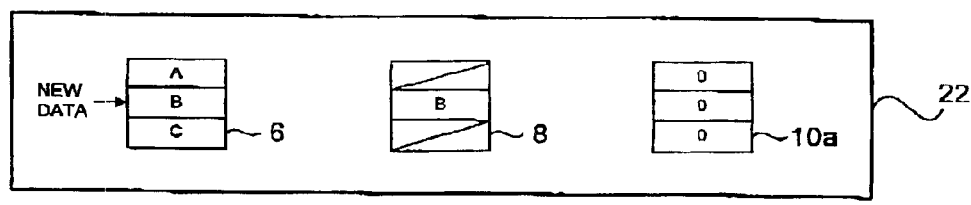
Figure 4C:
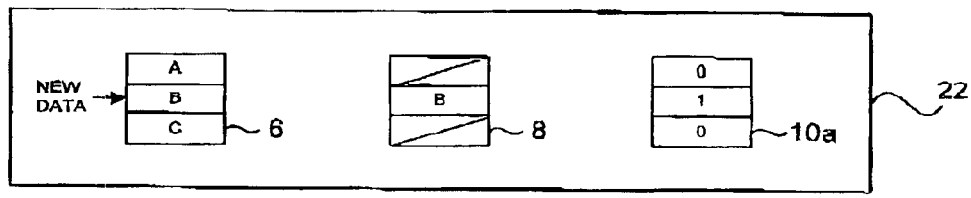
Figure 4D:
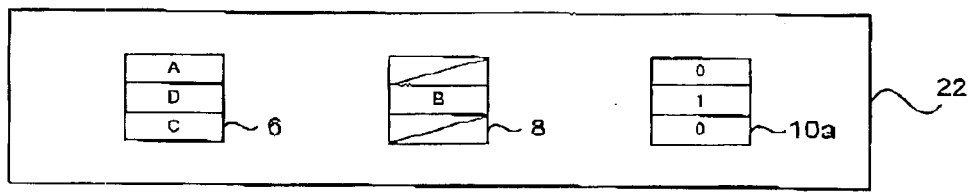
Figure 4E:
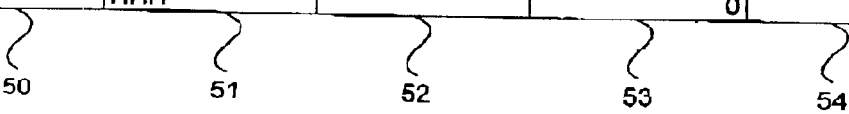
FIGS. 4e and 4f show tables for illustrating examples of creation of point in time copies in the dependent mode.
Figure 4F:
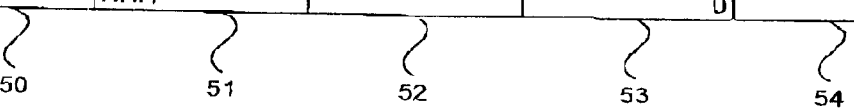

FIGS. 4e and 4f illustrate the changes in the mass storage device 22 during the creation and maintenance of a point in time copy in the dependent mode for a specific simplified example by use of a table having five columns 50, 51, 52, 53 and 54 headed master, virtual shadow, shadow, shadow bitmap and copy bitmap, respectively. The column 50 headed master has rows representing the different data blocks of the master store 6 so that, as shown, the data "AAA" is stored in one data block, the data "BBB" in stored in the next data block and so on. The rows of the column 51 headed "virtual shadow" represent the corresponding data blocks forming the point in time copy. Because this is the dependent mode, the "virtual shadow" does not exist as a separate entity but will be assembled from unchanged data blocks stored in the master store 6 and data blocks stored in the shadow store 8. The rows in the column 52 headed "physical shadow" represent the data blocks stored in the shadow store 6 while the rows in the column 53 headed "shadow bitmap" represent the corresponding bits in the shadow bitmap 10a stored in the bitmap store 10 and the rows in the column 54 headed "copy bitmap" represent the corresponding bits in a copy bitmap 10b in the bitmap store 10.

Creation of a point in time copy in the dependent mode will now be described.

When a user elects, using the user interface 21 or network interface 83 in FIG. 1, to create a point in time copy of the data stored in the master store 6 at a particular time using the dependent mode then, at S15 in FIG. 3, the point in time copy controller 4 initialises the shadow bitmap 10a by setting all of the bits in the shadow bitmap to 0 (zero) as shown in FIGS. 4a and 4e. Setting the bits in the bitmap 10a to zero indicates that the data stored in the master store 6 has not been changed since the user requested a point in time copy and that therefore the data in the master store 6 represents the point in time copy.

The data processor 23 from time to time writes to the master store 6 to update a file in accordance with further processing carried out by the data processor 23 or changes communicated to the host computer from another computing apparatus over the network interface 83. This may result in one or more data blocks in the master store 6 being overwritten.

When overwritten, these data blocks in the master store 6 of course no longer represent the point in time copy required by the user. Accordingly, before the data processor 23 is permitted to overwrite a data block in the master store 6, the controller 20 advises the point in time copy controller 4 that that data block is about to be overwritten.

When, at S16 in FIG. 3, the point in time copy controller 4 determines that a data block is to be overwritten, then, at S17 in FIG. 3, the point in time copy controller 4 copies the current or old data block to the corresponding data block address in the shadow store 8 (as shown for data block B in FIG. 4b) and, at S18, sets the shadow bit corresponding to that data block in the shadow bitmap to 1 (one) as shown in FIG. 4c. When, at S19 in FIG. 3, the controller 20 is advised by the point in time copy controller 4 that the data block to be overwritten has been copied to the corresponding data block address in the shadow store 8, the controller 20 communicates to the data processor 23 permission to overwrite that data block in the master store 6 with the new data block D as shown in FIG. 4d.

A zero bit in the shadow bitmap 10a thus indicates that the corresponding block of data for the point in time copy is to be found in the master store 6 while a 1 bit in the shadow bitmap 10a indicates that the corresponding data for the point in time copy is to be found in the shadow store. The copy bitmap 10b is not used in creation of the point in time copy in dependent mode.

In the example illustrated by FIGS. 4e and 4f, the second and sixth data blocks (the second and sixth rows in column 50) have been overwritten and accordingly, prior to this overwriting, the point in time copy controller 4 has copied the data "BBB" and "FFF" from the second and sixth blocks of the master store 6 to the corresponding addresses in the shadow store 8 as shown and has set the corresponding bits in the shadow bitmap to 1 as can be seen by comparing the entries for rows two and six in columns 50, 52 and 53 in FIGS. 4e and 4f.

When a user (either a user at the user interface 21 or a user communicating with the host computer over the network interface 83) requests access to the point in time copy, then the point in time copy controller 4 assembles the point in time copy or "virtual shadow" as shown in column 51 in FIG. 4f by copying blocks of data from the master store where the corresponding bit in the shadow bitmap is set to 0 and copying blocks of data from the shadow store where the corresponding bit in the shadow bitmap is set to 1. The point in time copy controller 4 thus reassembles the data stored in the master store at the time the point in time copy was requested so that the point in time copy can be processed by the point in time copy processor 25 in accordance with the user's instructions, for example the point in time copy may be subject to further processing, supplied over the network via the network interface 83 to another computing apparatus for further processing or storage or may be output to a backup storage device. Thus, the point in time copy controller 4 and shadow bitmap 10a enable a point in time copy to be made immediately when desired and subsequently accessed and copied to other locations for data analysis or storage on request.

Figure 5A:
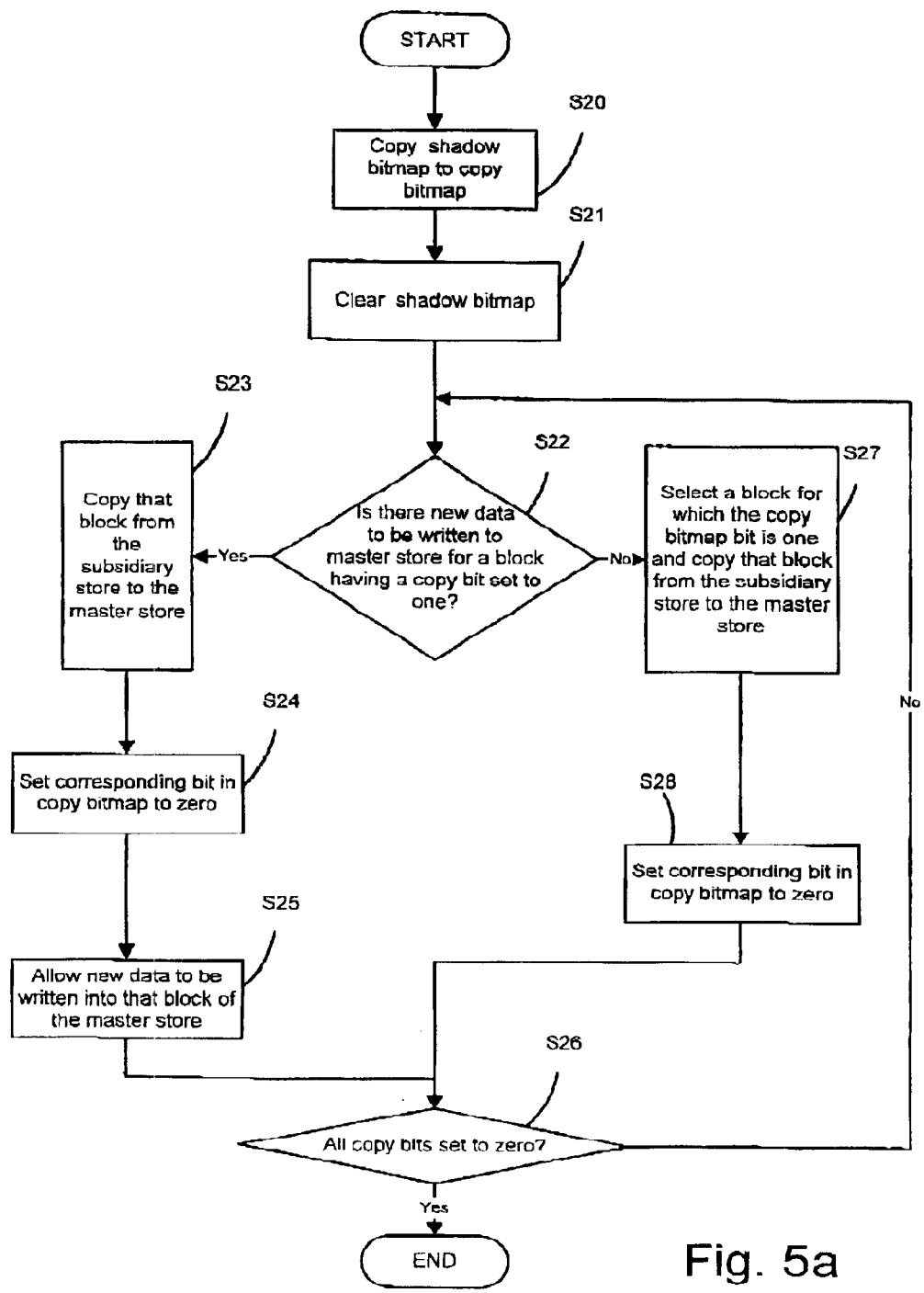
FIG. 5a shows a flow chart for illustrating recovery of a master copy from a point in time copy in the dependent mode.

Recovery of a master copy from a point in time copy in the dependent mode will now be described with reference to FIGS. 5a to 5e in which FIG. 5a shows a flow chart for illustrating recovery of a master copy from a point in time copy and FIGS. 5b to 5e show diagrams for illustrating stages in the recovery of a master copy from a point in time copy in the dependent mode for the case where the master store 6, shadow store 8, shadow bitmap 10a and copy bitmap lob of the mass storage device 22 have the states shown in FIG. 4d, that is after creation of a point in time copy in the dependent mode and after the data block B has boon overwritten by the data block D in the master store as described above with reference to FIGS. 3 and 4a to 4f.

Figure 5B:
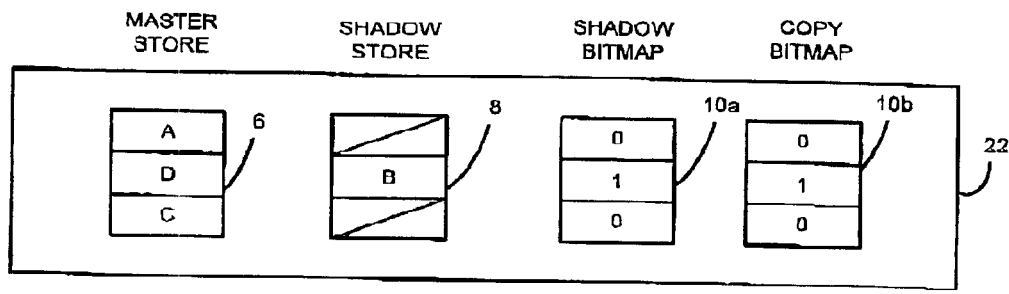
FIGS. 5b to 5e show diagrams for illustrating stages in the recovery of a master copy from a point in time copy in the dependent mode.

When a user instructs recovery of a master copy either directly using the user interface 21 or via the network interface 83 in FIG. 1, then at S20 in FIG. 5a, the point in time copy controller 4 copies the shadow bitmap to the copy bitmap so that every bit in the copy bitmap has the same state as the corresponding bit in the shadow bit map as shown in FIG. 5b. Thus a one in the shadow bitmap indicating that the point in time copy data for that block is in the subsidiary or shadow store 8 is copied to the copy bitmap indicating that that block is to be copied from the shadow store.

Figure 5C:
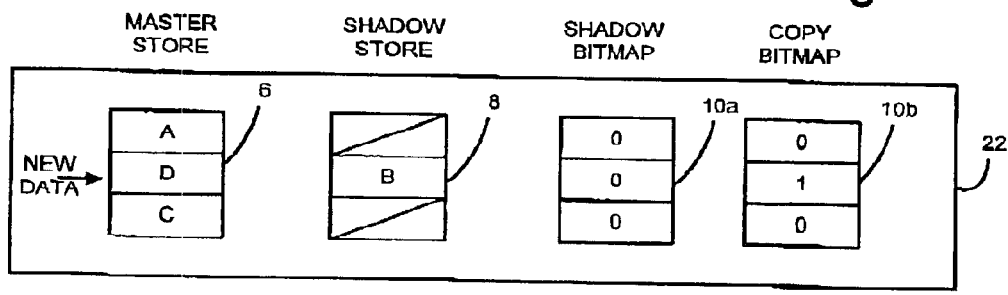
Figure 5D:
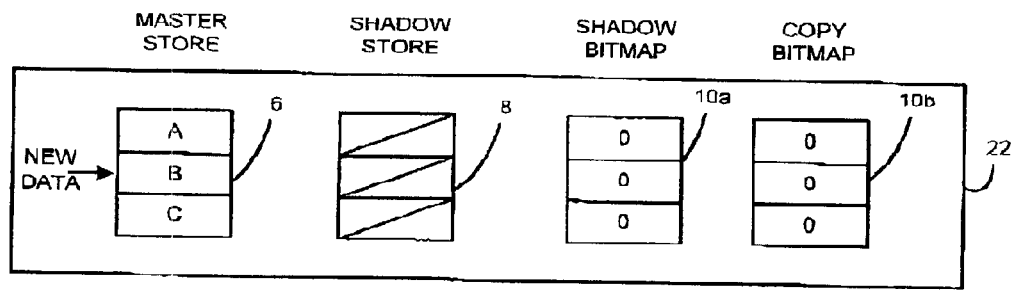
Figure 5E:
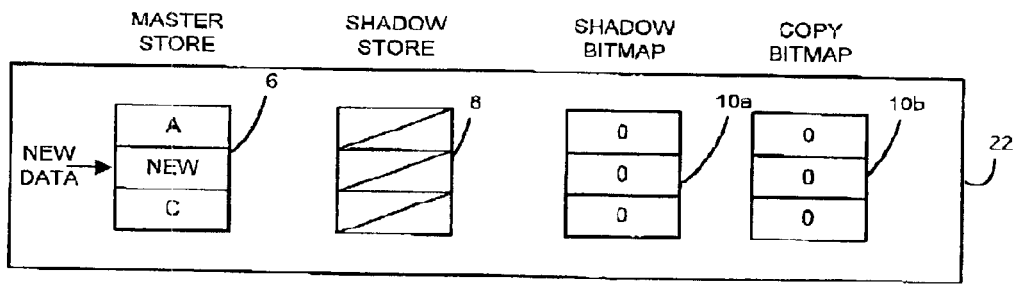

At S21 in FIG. 5a, the point in time copy controller 4 clears the shadow bitmap by resetting all the bits to zero as shown in FIG. 5c. Then at S22 in FIG. 5a, the point in time copy controller 4 checks to see whether the data processor 23 wishes to write new data to a data block in the master store 6. If, as shown in FIG. 5c by the arrow and the legend "NEW DATA", the answer is yes, then the point in time copy controller 4 copies that data block from the shadow store 8 to the master store 6 at S23 and at S24 sets the corresponding copy bit to zero as shown in FIG. 5d. Then, at S25, the point in time copy controller 4 allows the new data "NEW" to be written into the that data block as shown in FIG. 5e. Copying the data block back to the master store prior to overwriting it ensures that an accurate copy exists in the event of a system crash before the data is overwritten.

If, however, the answer at S22 is no, then at S27 the point in time copy controller 4 selects the data block associated with a first or a next copy bit of status land copies that data block from the shadow store 8 to the master store 6. Then, at S28 in FIG. 5a, the point in time copy controller 4 sets the corresponding copy bit to zero.

At S26 in FIG. 5a the point in time copy controller 4 checks whether any of the copy bits still have a status 1 and if so, repeats S22 to S26 until all the copy bits are zero, indicating that all of the data blocks stored in the shadow store 8 have been copied back to the master store 6 to restore the master copy. Of course, if the data processor 23 has written to the master store 6 during the recovery or restoration process, then those data blocks will have been overwritten.

The above described dependent mode of point in time copy creation has the advantage that it involves the minimum amount of data copying because a data block is not copied to the shadow store 8 until just before that data block is overwritten.

Operation of the point in time copy system in the independent mode will now be described with the aid of FIGS. 6a to 6c, 7a to 7f, 8a and 8b.

Figure 6A:
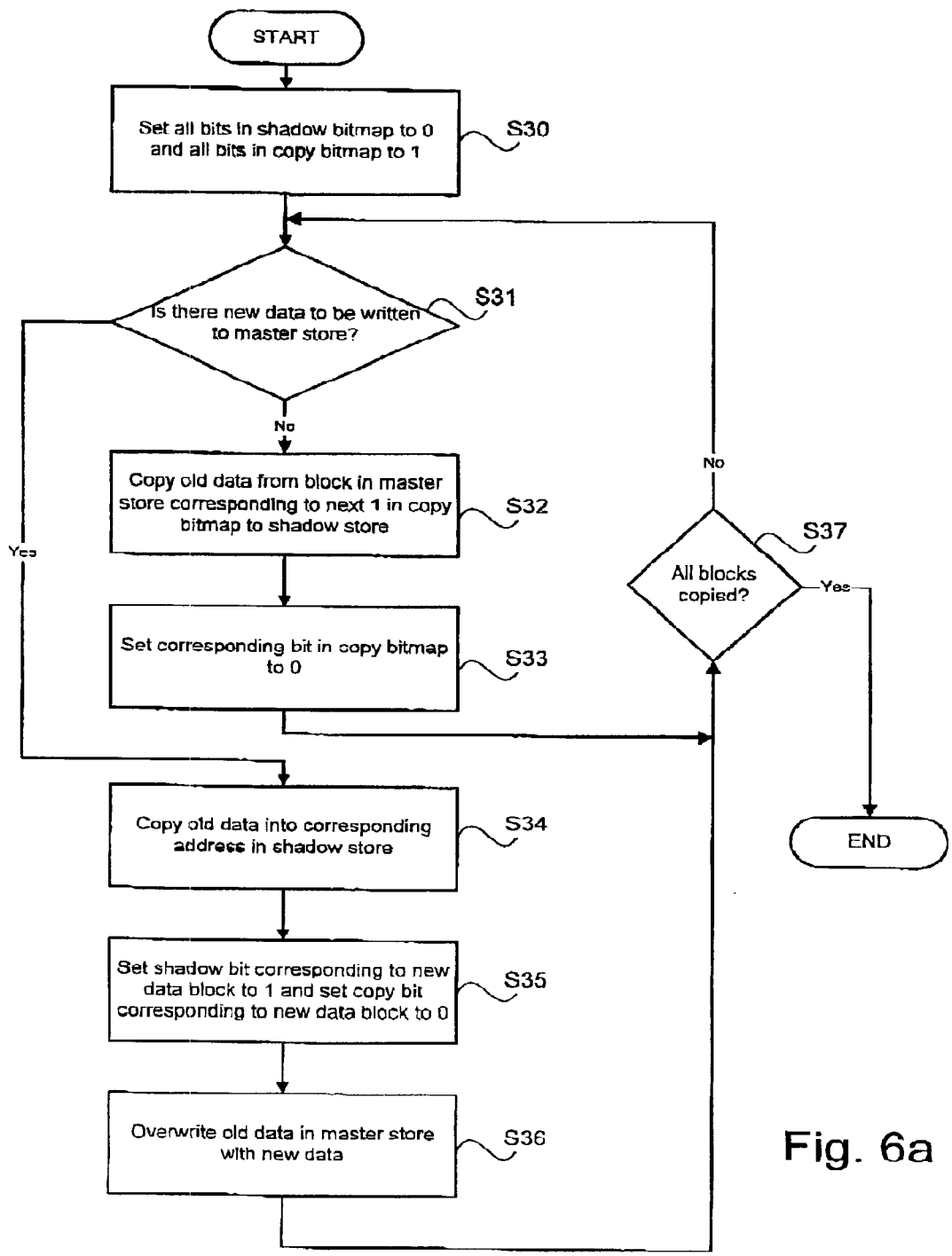
FIG. 6a shows a flow chart for illustrating operation of the point in time system to create an initial point in time copy in an independent mode.

FIG. 6a shows a flow chart illustrating operations carried out by the point in time copy system in the independent mode while FIGS. 7a to 7f show diagrams similar to those shown in FIGS. 4a to 4d to illustrate the state of the master store 6, shadow store 8, shadow bitmap 10a and copy bitmap 10b at various stages during creation and maintenance of a point in time copy in the independent mode.

FIGS. 8a and 8b shows tables similar to those shown in FIGS. 4e and 4f with, again, columns 60, 61, 62, 63 and 64 representing the master store, the actual point in time copy or virtual shadow, the shadow store, the shadow bitmap and the copy bitmap with, as in FIGS. 4e and 4f, each row in columns 60, 61 and 62 representing a corresponding data block and the rows in columns 63 and 64 representing the corresponding bits of the bitmaps.

Figure 7A:
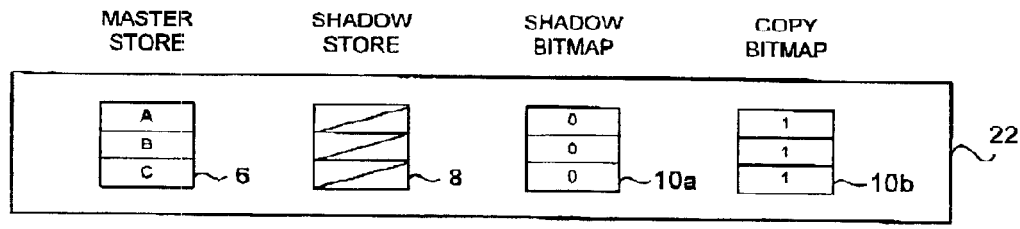
FIGS. 7a to 7f show diagrams for illustrating stages in production of a point in time copy in the independent mode.
Figure 7B:
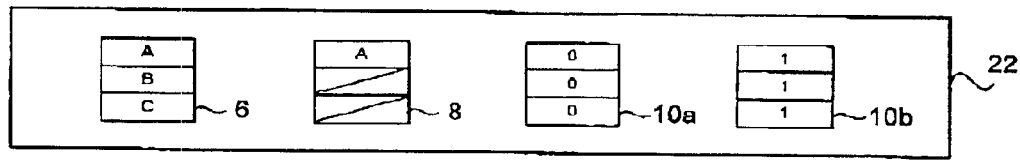

When a user instructs the point in time copy system to create a copy in the independent mode, then at S30 in FIG. 6a, the point in time copy controller 4 initialises the shadow bitmap 10a and the copy bitmap 10b by setting all bits in the shadow bitmap to 0 and all bits in the copy bitmap to 1 as shown in FIGS. 7a and 8a.

In the independent mode, the point in time copy controller 4 copies all of the data blocks stored in the master store 6 to the shadow store a in order to create the point in time copy. The compilation of the point in time copy in the shadow store 8 thus inevitably takes some time and, during creation of the point in time copy, the data processor 23 may request access to the master store 6 to overwrite one or more data blocks.

In order to ensure that an accurate point in time copy is created, the point in time copy controller checks at S31 in FIG. 6a whether there is now data to be written to the master store 6. If the answer is no, then the point in time copy controller 4 copies the data from the first block in the master store 6 to the shadow store 8. In the example shown by FIG. 7b, the point in time copy controller 4 causes data block A to be copied to the shadow store 8.

Figure 7C:
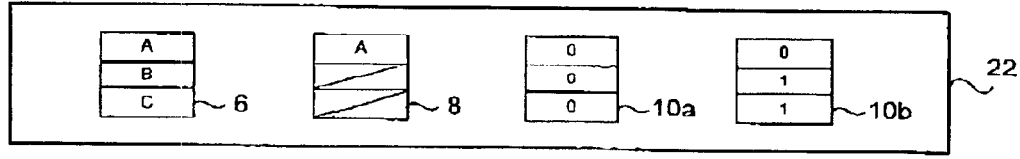

Then, at S33 in FIG. 6a, the point in time copy controller 4 sets the corresponding bit in the copy bitmap to 0 (as shown in FIG. 7c) and repeats operations S31 to S33 until all data blocks have been copied to the shadow store 8 (S37 in FIG. 6a).

Figure 7D:
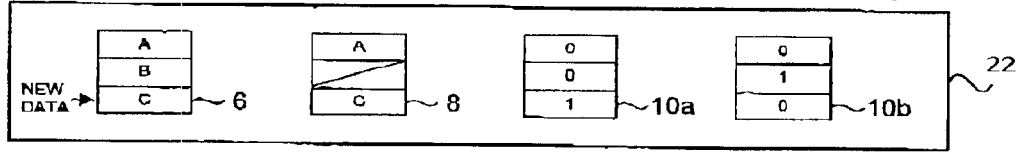
Figure 7E:
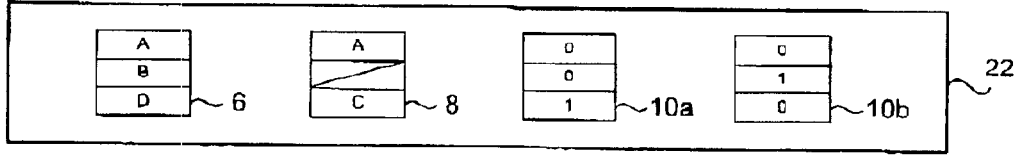

If, however, the point in time copy controller 4 determines at S31 in FIG. 6a that a data block is to be overwritten in the master store 6, then at S34 in FIG. 6a, the point in time copy controller 4 checks whether the copy bitmap 10a bit for that data block is set at 0 (indicating that the data has already been copied) or is still set at 1. If the copy bit is still set at 1 as shown in FIG. 7c for data block C, then, before the data block C is overwritten, the point in time copy controller 4 copies the data block C into the corresponding address in the shadow store 8 (S34 in FIG. 6a), sets the shadow bit corresponding to that data block to 1 to indicate that that data block in the master store 6 has been overwritten (that is the point in time copy of that data block is in the shadow store 8) and, in addition, sets the copy bit corresponding to that data block to 0 in the copy bitmap 10b to indicate that that data block has been copied to the shadow store 8 (as shown in FIG. 7d) and the data processor 23 can now overwrite the old data block in the master store 6 with the new data D. This state is illustrated in FIG. 7e.

Figure 7F:
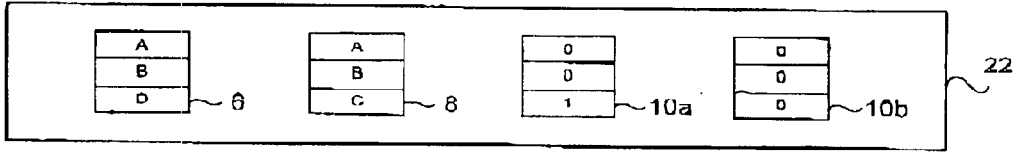

The point in time copy controller then checks at S37 in FIG. 6a whether any of the blocks forming the point in time copy still need to be copied to the shadow store 8, that is whether any of the bits in the copy bitmap 10b are still 1 and, if go, repeats operations S31 onwards. For the example shown in FIGS. 7a to 7f, the point in time copy controller 4 determines that the copy bit corresponding to the second data block is still 1 and accordingly proceeds to copy the data block data "B" to the shadow store and then set the corresponding bit in the copy bitmap to 0 to indicate that the data in that block has been copied as shown in FIG. 7f. Once all the copy bits are 0, then the point in time copy controller 4 determines that the point in time copy in the shadow store is complete. Of course, further requests may be received from the data processor 23 to overwrite data blocks in the master store 6. Each time such a request is received and a data block in the master store 6 is overwritten, the point in time copy controller 4 flips the corresponding bit in the shadow bitmap 10a from 0 to 1, if necessary, to indicate that the data in the master store 6 no longer agrees with the point in time copy.

Figure 6B:
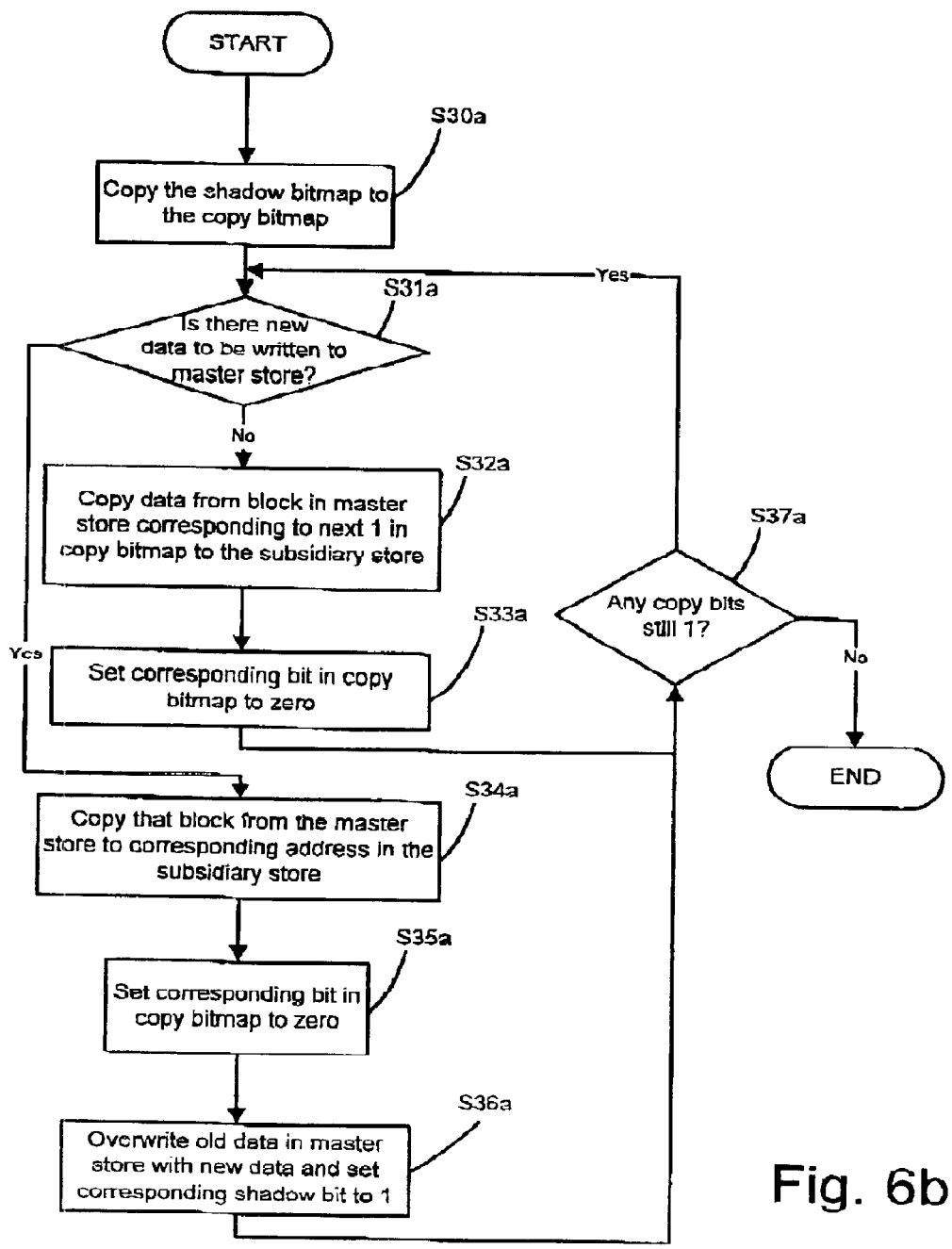
FIG. 6b shows a flow chart for illustrating operation of the point in time system to create a subsequent point in time copy in the independent mode.

In this case, the state of the bits in the shadow bitmap 10a facilitates creation of future point in time copies. FIG. 6b shows operations carried out by the point in time copy controller 4 to create a further point in time copy. Thus, when the point in time copy controller 4 is requested at a later time or date to create a further point in time copy, then the point in time copy controller 4 copies the shadow bitmap to the copy bitmap at S30a in FIG. 6b so that every bit in the copy bitmap has the same state as the corresponding bit in the shadow bit map. Thus, after copying of the shadow bitmap to the copy bitmap, if the status of the bit in the shadow bitmap was 0, that is that particular data block has not changed since the last point in time copy was produced, then the status of the copy bit will be zero indicating that that data block does not need to be copied to provide the new point in time copy whereas, if the status of the bit in the shadow bitmap was 1, then the corresponding bit in the copy bitmap will now be 1 indicating that the data in the corresponding block has changed (for example the data block D in the third block shown in FIG. 7f) and that that data block needs to be copied.

Then the point in time copy controller 4 carries out operations similar to the operations S31 to S37 described above. Thus, at S31a in FIG. 6b, the point in time copy controller 4 checks whether the data processor 23 wishes to write to a data block in the taster store 6 and, if the answer is yes, at S34a copies that data block from the master store 6 to the corresponding address in the shadow store 8, at S35a sets the corresponding bit in the copy bitmap 10b to zero, indicating that the data block has been copied to the shadow store 8 and at S36a allows the data processor 23 to overwrite the old data in the master store 6 with the new data and sets the corresponding bit in the shadow bitmap 10a to 1 to indicate that that data block in the master store is no longer the same as the corresponding data block in the shadow store. If, however, the answer at S31a is no, that is there is no new data to be written to the master store 6, then, at S32a the point in time copy controller 4 copies the data block associated with the first or a next 1 in the copy bitmap from the master store 6 to the corresponding address in the shadow store 8 and at S33a sets the corresponding bit in the copy bitmap 10b to zero to indicate that the data block has been copied to the shadow store 8.

After S36a or S33a, the point in time copy controller 4 checks at S37a whether there are any copy bits still set to 1, indicating that there are data blocks in the master store 6 that still need to be copied to the shadow store to produce the point in time copy. If the answer is yes, the point in time copy controller 4 repeats the operations of S31a to S37a until the answer at S37a is no, that is until all of the copy bits are zero, indicating that all of the data blocks in the master store 6 at the time the point in time copy was requested have been copied to the shadow store 8 to create the new point in time copy.

The operations shown in FIG. 6b are repeated each time a new point in time copy is requested.

This means that, once a point in time copy has been created in the shadow store 8 in the independent mode, future point in time copies can be created simply by updating the previous point in time copy and it will only be necessary to copy all the data blocks from the master store 6 if they have all changed since the last point in time copy was created. Accordingly, once an initial point in time copy has been created, future point in time copies can be created more quickly. The table columns 60, 62, 63 and 64 shown in FIG. 8a illustrate the state of the data blocks in the master and shadow stores and the state of the bits in the shadow and copy bitmaps immediately after a user has requested that the point in time or virtual shadow (shown in column 61) be created. Thus, the shadow bitmap bits have been initialised to 0 and the copy bitmaps have been initialised to 1 to indicate that each of the data blocks needs to be copied into the shadow store to create the virtual shadow. FIG. 8b shows the state of these columns after creation of the point in time copy or virtual shadow illustrated by FIG. 8b when the data blocks in the second and fifth rows have been overwritten by the new data blocks NEW, causing the point in time copy controller 4 to change the corresponding bits in the shadow bitmap to 1.

Recovery of a master copy from a point in time copy in the independent mode will now be described with reference to FIG. 6c which shows a flow chart for illustrating recovery of a master copy from a point in time copy.

Figure 6C:
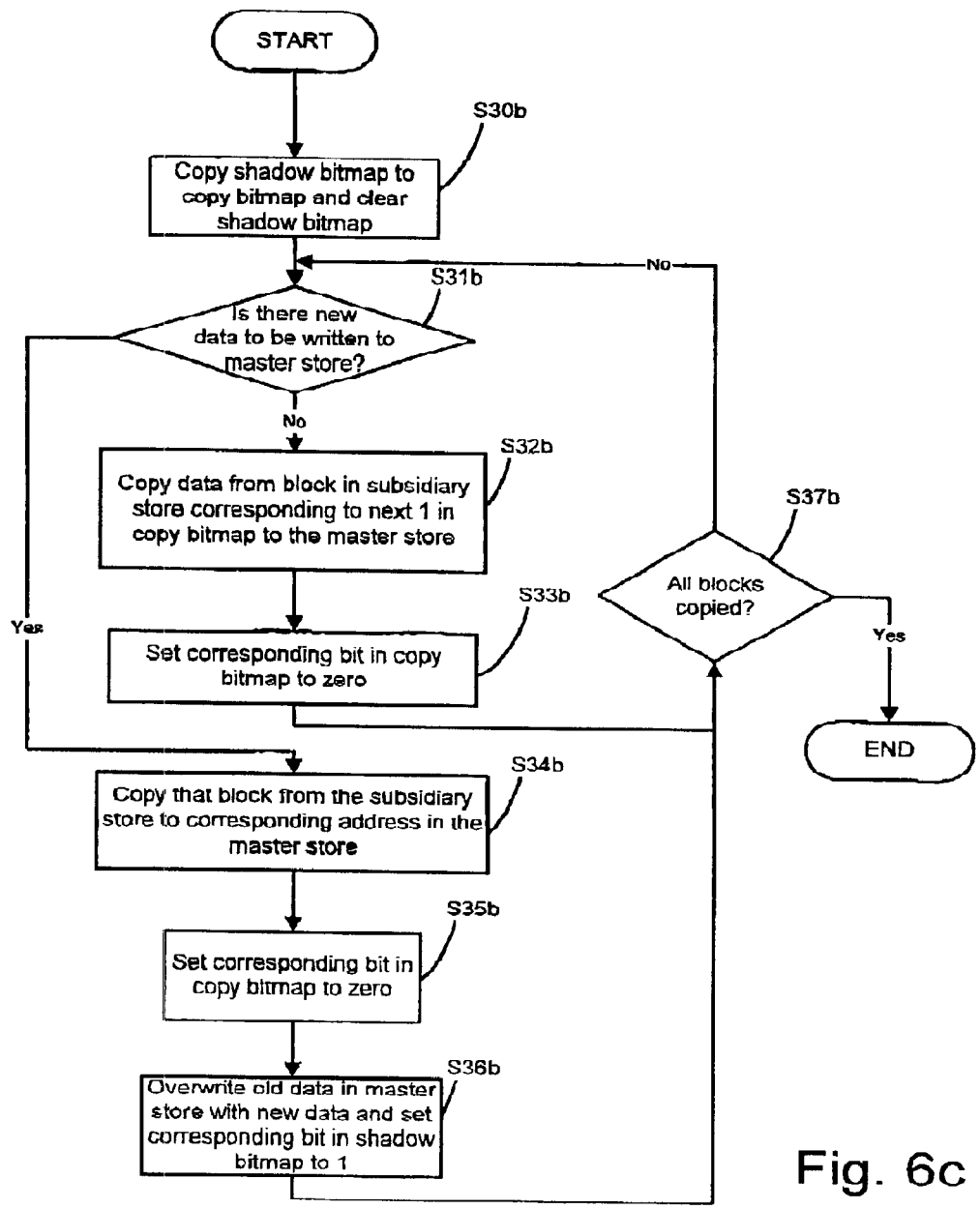
FIG. 6c shows a flow chart for illustrating recovery of a master copy from a point in time copy in the independent mode.

When a user instructs recovery of a master copy either directly using the user interface 21 or via the network interface 93 in FIG. 1, then at S30b in FIG. 6c, the point in time copy controller 4 copies the shadow bitmap 10a to the copy bitmap 10b to indicate the data blocks in the shadow store 8 to be copied from the shadow store 8 back to the master store 6 and then clears the shadow bitmap.

Then at S31b in FIG. 6c, the point in time copy controller 4 checks to see whether the data processor 23 wishes to write new data to a data block in the master store 6. If the answer is yes, then the point in time copy controller 4 copies that data block from the shadow store 3 to the master store 6 at S34b and at S35b sets the corresponding copy bit to zero. Then, at S36b in FIG. 6c, the point in time copy controller 4 allows the new data to be written into that data block and sets the corresponding bit in the shadow bitmap to 1.

If, however, the answer at S31b is no, then at S32b the point in time copy controller 4 selects the first or next data block in the shadow store 8 and copies that data block from the shadow store 8 to the master store 6. Then, at S32b in FIG. 6c, the point in time copy controller 4 sets the corresponding copy bit to zero.

After S33b or S36b, the point in time copy controller 4 checks at S37b whether all of the data blocks have been copied back to the master store 6 from the shadow store 8 (by checking whether any of the copy bits are still1) and, if the answer is no, that is that not all data blocks have been copied, repeats operations S31b to S37b until the answer at S37b is yes, indicating that all of the data blocks stored in the shadow store 8 have been copied back to the master store to restore the master copy. Of course, if the data processor 23 has written to the master store during the recovery or restoration process, then those data blocks will have been overwritten.

Using the independent mode has the advantage that after the independent mode copy has been made, the shadow store 8 contains a complete point in time copy and it is not necessary to delay writing new data blocks to the master store 6 to give time for the old data blocks to be copied across to the shadow store 8. Rather, all that is necessary is that the state of the corresponding bit in the shadow bitmap is changed to indicate that there is a difference between the shadow and the master stores.

Figure 9:
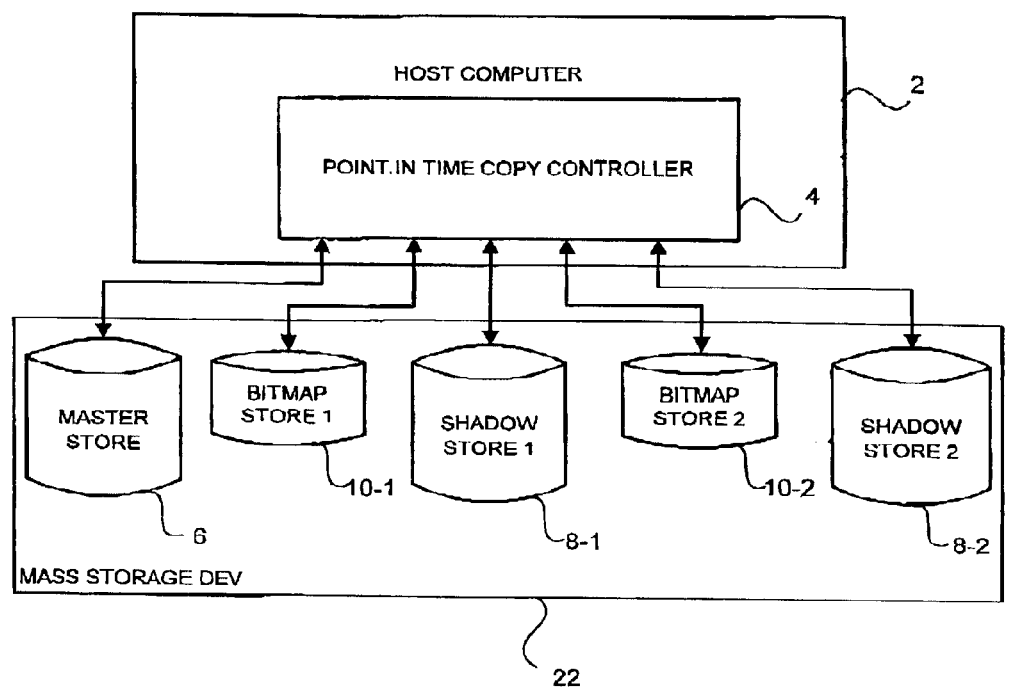
FIG. 9 shows a functional block diagram illustrating a first example of a point in time copy system embodying the present invention with the functional components of the host computer, apart from a point in time copy controller, omitted in the interests of clarity and simplicity.

FIG. 9 shows a functional block diagram similar to FIG. 1 of an example of a point in time copy system embodying the present invention. In the interests of simplicity, the various functional components within the host computer 2, apart from the point in time copy controller 4, are not shown in FIG. 9. It will, of course be appreciated that will be the same as those shown in FIG. 1.

The point in time copy system shown in FIG. 9 differs from that shown in FIG. 1 in that two shadow stores 8-1 and 8-2 are provided together with corresponding bitmap stores 10-1 and 10-2.

With this point in time copy system, a first point in time copy will be created and maintained using the shadow store 8-1 and the bitmap store 10-1 in the manner described above with reference to FIGS. 3 to 5e if the dependent mode is selected and with reference to FIGS. 6a to 8b if the independent mode is selected.

Figure 10:
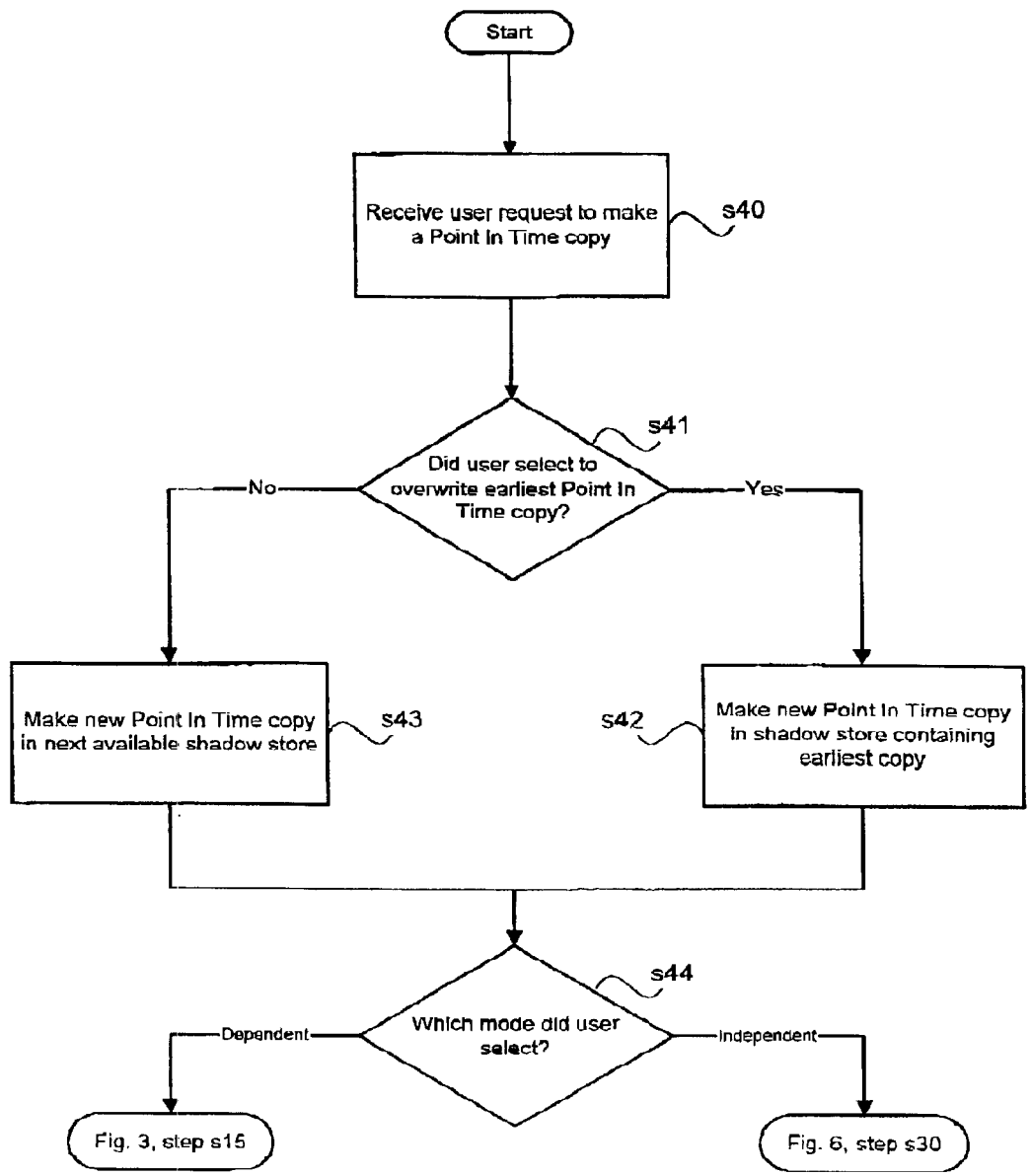
FIG. 10 shows a flow chart for illustrating steps carried out by the point in time copy system shown in FIG. 9.

FIG. 10 shows a flow chart illustrating operations carried out by the point in time copy controller 4 when a subsequent point in time is to be made using the point in time copy system shown in FIG. 9.

Thus, when at S40 in FIG. 10, the point in time copy controller 4 receives (via the user interface 21 or the network interface 83) a request from a user to make a point in time copy then, at S41 in FIG. 10, the point in time copy controller a determines whether the user has selected to overwrite the earliest point in time copy. If the answer a S41 is yes, then, at S42 in FIG. 10, the point in time copy controller 4 updates the existing point in time copy defined by the point in time copy data stored in the shadow store 8-1 and the bitmap store 10-1 by overwriting any data blocks of the shadow store with the corresponding data blocks of the master store 6 where the corresponding bit of the shadow bitmap is 1 indicating that the data has changed since the last point in time copy was produced. In this case, the earlier point in time copy is lost.

If, however, the user has selected not to overwrite the earliest point in time copy then, at S43 in FIG. 10, the point in time copy controller 4 creates a fresh point in time copy using the shadow store 8-2 and the bitmap store 10-2 in the manner described above with reference to FIGS. 3 to 5e where the dependent mode is selected and in the manner described above with reference to FIGS. 6a to 8b where the independent mode is selected.

In the example illustrated in FIG. 9 two shadow stores 8-1 and 8-2 and corresponding bitmap store 10-1 and 10-2 are provided. Further shadow stores, each with an associated bitmap store may be provided to enable three, four or more point in time copies to be created.

The point in time copy system shown in FIG. 9 thus enables two or more (depending upon the number of shadow stores and associated bitmap stores) to be maintained. In this case, the point in time copy controller 4 changes the state of the bit in the corresponding shadow bitmap (if the bit does not already indicate a previous change to the block of data in the master store) each time data in the master store 6 is overwritten subsequent to creation of the corresponding point in time copy. Accordingly, the shadow bitmap associated with each point in time copy indicates the data blocks of the master store 6 that have changed since that point in time copy was created.

This means that a previous point in time copy can be maintained without having to copy that point in time copy to an off-line backup or archive store such as a tape backup. A previous point in time copy can thus be accessed more quickly and easily than if the point in time copy was only available on a backup store. This enables a user to access various different point in time copies and also enables a user, if necessary or desired, to restore the data in the master store 6 to the data stored at a particular point in time by overwriting the data in the master store 6 (or a copy of the data in the master store 6) with the data from the appropriate shadow store 8 where the corresponding bitmap indicates that the data in the corresponding block in the master store 6 has changed since the required point time copy was produced.

In this example, a user can request, via the user interface 21 or network interface 83, recovery or restoration of a master copy from any of the available point in time copies. Once recovery has been requested then the point in time copy controller 4 will access the shadow store and bitmap store storing the point in time copy data for the selected point in time copy and carry out the operations shown in FIG. 5a if the point in time copy was created in the dependent mode or the operations shown in FIG. 6c if the point in time copy was created in the independent mode.

This enables far more rapid regeneration of data for different points in time than would be possible than if it was necessary to access a backup store to obtain the data. Furthermore, the point in time copy system shown in FIG. 9 should reduce the amount of data that needs to be stored in the backup store. In addition, the bitmaps associated with the different point in time copies enable a user to identify quickly and easily which data blocks have changed the time.

Where two or more shadow stores 8 and associated bitmap stores 10 are provided, then the point in time controller 4 may be arranged to access these in a predetermined sequence when creating point in time copies. As described above, a point in time copy is only overwritten at the specific request of the user. As another possibility, the point in time copy controller may be configured to overwrite the earliest point in time copy automatically when all of the shadow stores and associated bitmap stores have been used to create point in time copies.

Figure 11:
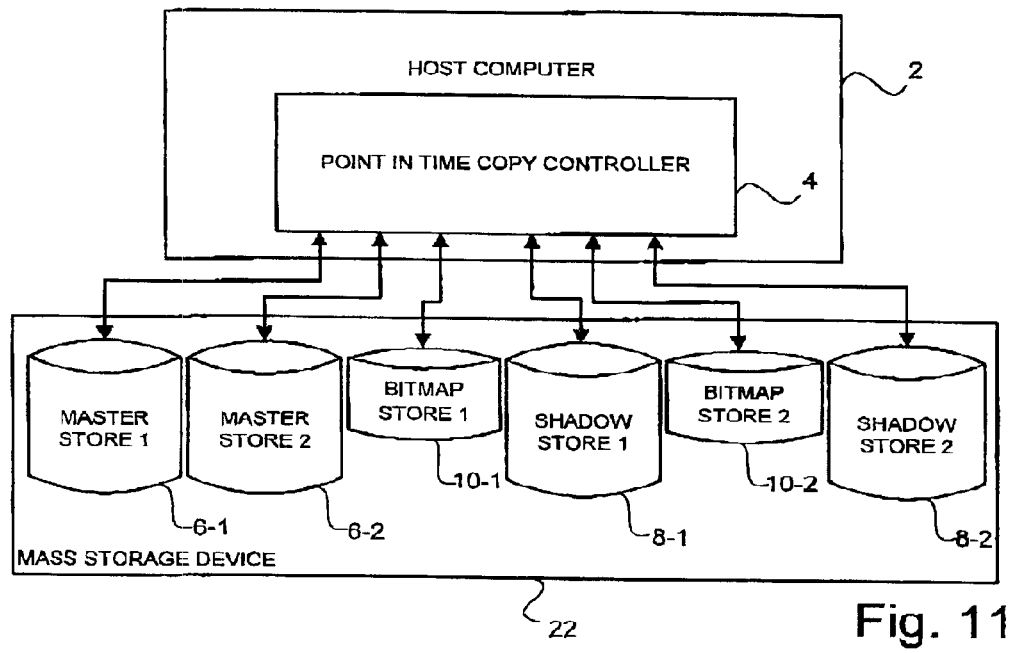
FIG. 11 shows a functional block diagram, similar to FIG. 9, of another example of a point in time copy system embodying the present invention.

FIG. 11 shows a functional block diagram similar to FIG. 9 of another example of a point in time copy system embodying the present invention.

In this example, the mass storage device 22 includes a plurality of master stores each associated with a corresponding shadow store and bitmap store. As shown in FIG. 11, two master stores 6-1 and 6-2, two shadow stores 8-1 and 8-2 and two bitmap stores 10-1 and 10-2 are provided. There may, of course, be three or more master stores each associated with a shadow store and bitmap store.

Such a plurality of master stores may be required to provide adequate storage for a large database, that is the database may be split between the master stores. In this case, when a user elects to make a point in time copy of the whole database, the point in time copy controller 4 initialises the bits in the shadow bitmaps (and copy bitmaps where the independent mode is used) of the various bitmap stores at the same time and separate shadow or point in time copies for the data stored in each master store are then made as described above.

In this case, the point in time copy controller 4 treats the separate master stores as a single store so that, if the data processor requests permission to write to a data block of any of the master stores, that data block is selected as the next to be copied so that the data block is copied before it is overwritten.

Initialising the bitmaps in the bitmap stores simultaneously ensures that the point in time copies created for the different master stores will be created for the same point in time enabling a genuine point in time copy of an entire database to be made even when the logical volume of the database is spread across a number of master stores, for example a number of different physical disc volumes. Furthermore, because the point in time copy controller 4 ensures that a bit in a shadow bitmap is changed when the corresponding data block of the associated master store is changed, the point in time copy can be easily and quickly updated so that successive simultaneous point in time copies can be produced.

In addition during recovery, the operation of S20 in FIG. 5a in the dependent mode or the operation of S30b in FIG. 6c in the independent mode will be carried out at the same time for each master store and the master stores will be treated as a single store so that, if the data processor requests permission to write to a data block of any of the master stores, that data block is selected as the next to be copied so that the data block is copied before it is overwritten.

Such a system may also be used where it is necessary to have simultaneous point in time copies for different or independent databases or files on different master stores.

It will, of course, be appreciated that in the examples described above, the or each bitmap store is significantly smaller than the corresponding master store because the bitmap store only needs to store the bitmap, which has a single bit per data block and the copy bitmap which again has the single bit per data block.

Figure 12:
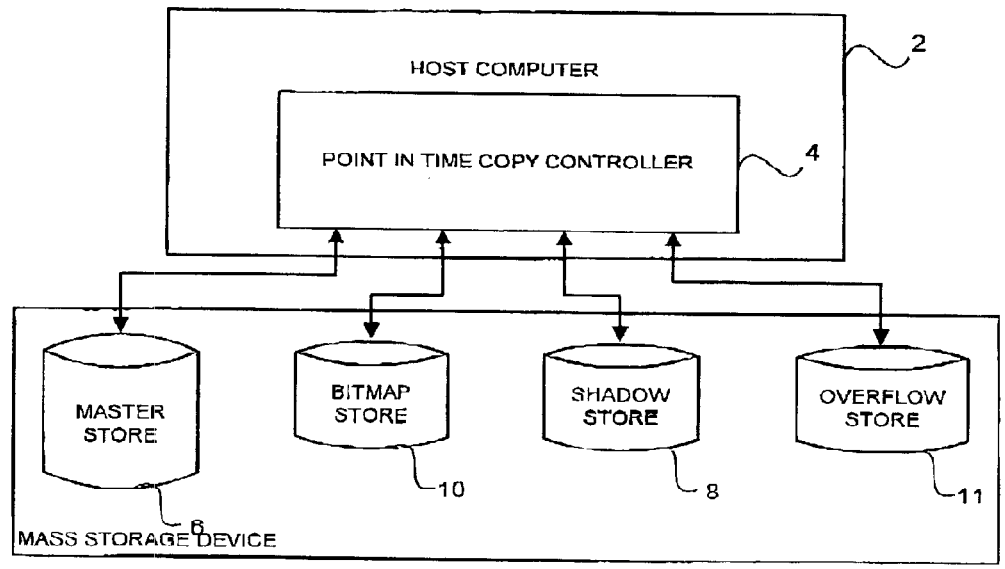
FIG. 12 shows a functional block diagram, similar to FIG. 9, of another example of a point in time copy system embodying the present invention.

FIG. 12 shows a functional block diagram similar to FIG. 11 of another example of a point in time copy system embodying the invention. In this example, the point in time copy system is arranged to operate in the dependent mode described above and, as illustrated diagrammatically in FIG. 12, the shadow store 8 is of reduced size, that is it has a smaller capacity than the master store 6 optionally, this point in time copy system also includes an overflow store 11.

Figure 13:
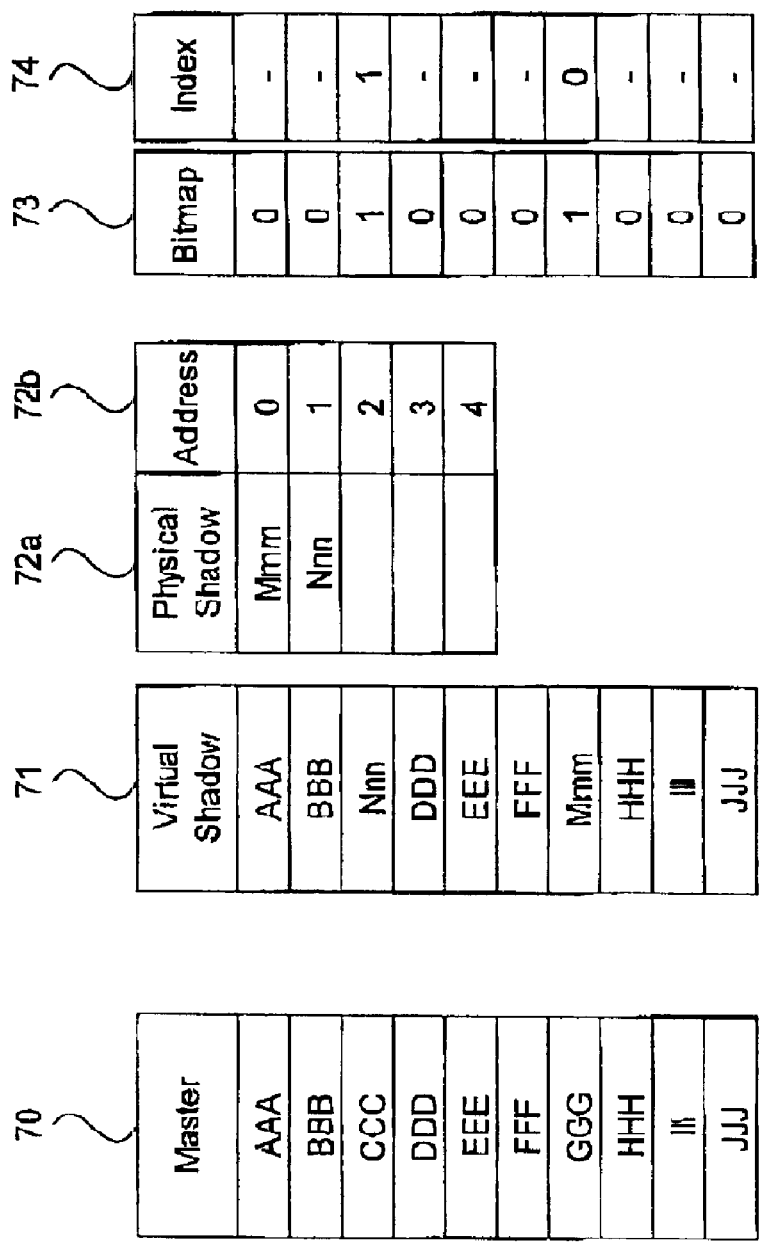
FIG. 13 shows a table for assisting in explaining creation of a point in time copy by the point in copy system shown in FIG. 12 when an overflow store shown in FIG. 12 is not present.

FIG. 13 shows a table similar to FIGS. 5a and 5b in which column 70 represents the master store 6 with each row in the column representing a corresponding different data block, column 71 represents the virtual shadow or point in time copy with, again, each row representing a corresponding data block and there being, as in FIGS. 4e, 4f, 8a and 8b, a one-to-one relationship between the data blocks in the master store 6 and the data blocks of the virtual shadow. Column 72a headed "physical shadow" represents the data stored in the shadow store and, as shown in FIG. 13, this column has as a smaller number of rows representing the fact that the shadow store 8 has a smaller storage capacity than the master store 6. In addition, there is no one-to-one correspondence between rows in the master store 6 and the shadow store 8, in this example. Each data block location in the shadow store 8 is associated with an address as shown in address column 72b. It will, of course, be appreciated that FIG. 13, like FIGS. 4e, 4f, 8a and 8b above, is only an illustrative example and that generally there would be very many more data blocks in the master store 6 and more than the five shown address locations in the shadow store 8.

As in the examples described above, the bitmap store 10 stores a shadow bitmap which is represented in FIG. 13 by column 73 and includes a single bit for each data block within the master store 6. The bitmap used for mapping the master store 6 to the shadow store 8 thus remains the same. However, in this example, the bitmap is associated with an index represented by column 74 and also, in this example, stored in the bitmap store 10. The indices in the index provide pointers to corresponding addresses of the shadow store 8.

In this case, a point in time copy is produced in the manner described above for the dependent mode. As described above, when the initial point in time copy is produced, then the data stored in the master store 6 represents the point in time copy, no data is stored in the shadow store 8 and all of the bits in the shadow bitmap represented by column 73 will be set to 0. However, in this case, when the point in time copy controller 4 determines that the data processor 23 wishes to overwrite a data block in the master store 6, then prior to allowing overwriting of the data, the point in time copy controller 4 copies the old data block to an address location within the shadow store 9, flips the corresponding bit in the shadow bitmap to indicate that the master data for that block no longer corresponds to the point in time copy, and in addition, updates the index to associate the bit for that data block with an index pointing to the corresponding address in the shadow store 8. To illustrate this, FIG. 13 shows the case where, subsequent to creation of the point in time copy represented by the virtual shadow column 71, the data in the third data block has changed from "Nnn" to "CCC" and the data in the seventh data block has changed from "Mmm" to "GGG". In this case, prior to the data in these data blocks being changed, the point in time copy controller 4 has copied that data "Mmm" and "Nnn" to locations in the shadow store 8, in the example shown addresses 0 and 1, respectively and has flipped the corresponding bits in the bitmap to indicate that these data blocks in the master store and point in time copy no longer are identical and, in addition, has updated the index shown in column 74 to point to the addresses in the shadow store 8 at which the replaced data block is located. Thus, in the example shown, the index 1 is associated with the bit for the third data block and the index 0 is associated with the bit for the seventh data block. The point in time copy controller 4 generally allocates the address locations in the shadow store 8 in order as changes arise between the master store and the shadow store, that is the old data blocks for consecutive changes are stored in consecutive addresses. However, any predefined order of allocation of addresses may be used.

When a user requests that a point in time copy created by the system shown in FIG. 12 (without the overflow store 11) be restored to the master store, then the point in time copy controller 4 carries out the operations shown in FIG. 5a using, at S23 and S27 in FIG. 5a, the index data associated with the bit in the shadow bit map to determine the address in the shadow store 8 at which the data block to be copied back to the master store is located.

The point in time copy system shown in FIG. 12 (omitting the overflow store 11) enables the size of the shadow store 8 to be reduced from that shown in FIG. 1, that is the shadow store can be of smaller capacity than the master store 6, by including an address index in the bitmap store 10 that points to the locations in the shadow store 8 at which data blocks that have been replaced since the point in time copy was created can be located so that a one-to-one address correspondence between data blocks in the master store and the shadow store is not required. The size of the blocks of data is such that the reduction in size of the shadow store 8 outweighs the increase in size of the bitmap store 10 to incorporate the address index shown in column 74 in FIG. 13. The size of shadow store 8 required will depend upon the file size of the file stored in the master store, the application being used by the host computer or network and the number of data blocks that change after a point in time copy is created. The latter will also be partly dependent on the frequency with which point in time copies are taken. Selection of the size or memory capacity required for the shadow store 8 will thus be application dependent.

The mass storage device 22 of the point in time copy system shown in FIG. 12 may additionally have an overflow store 11 which enables further data to be stored if the reduced capacity shadow store 8 becomes full.

Figure 14:
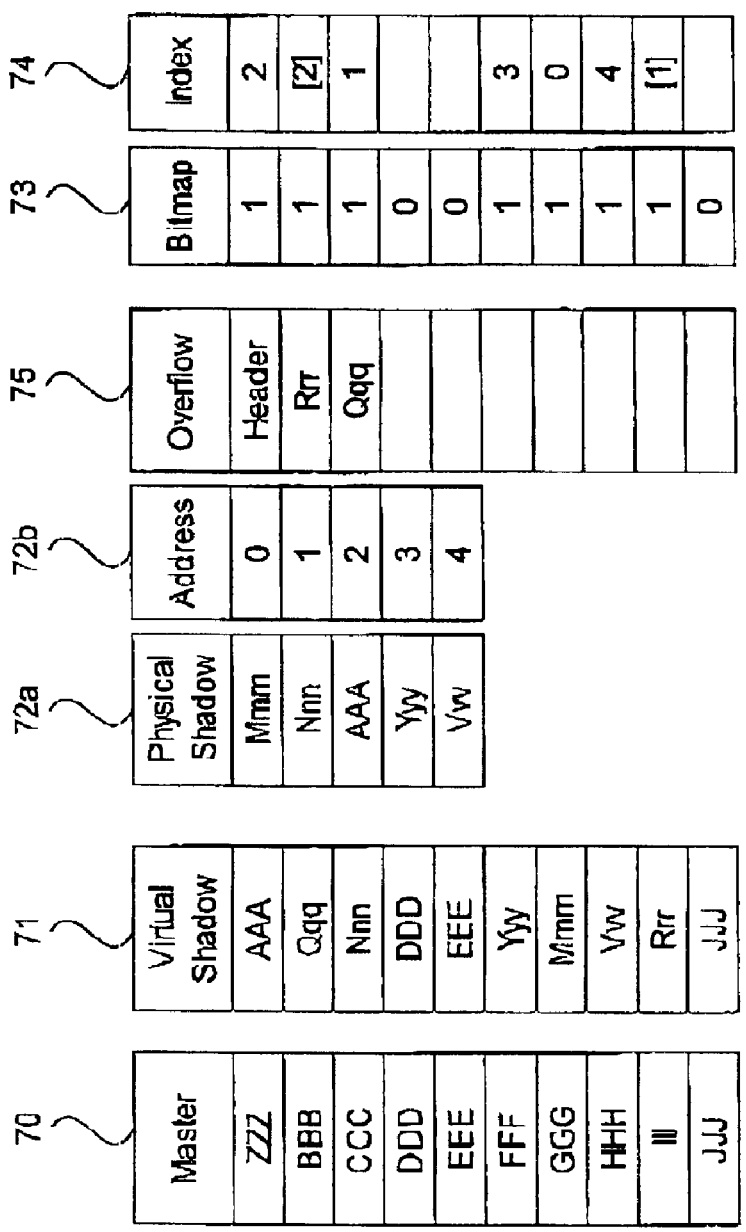
FIG. 14 shows a table for illustrating creation of a point in time copy by the point in time copy system shown in FIG. 12 when the overflow store is present.

FIG. 14 shows an illustrative table that differs from the table shown in FIG. 13 (apart from the actual data represented in the columns) by virtue of the inclusion of a further column 75 representing the data stored in the overflow store 11. As shown in FIG. 14, the first address in the overflow store 11 contains header information which identifies the overflow store 11 as an overflow store or volume and also points to the next free address within the overflow store. In this example, as data blocks in the master store 70 are changed subsequent to creation of a point in time copy, the changed data blocks are stored in the shadow store 8 and the index associated with the bitmap is updated as described above so as to point to the corresponding addresses in the shadow store 8. When all locations in the shadow store 8 are full, then subsequent data blocks to be overwritten are copied into the overflow store 11. As shown in FIG. 14, the next two data blocks to be changed are physically stored in the overflow store 11 at addresses 1 and 2 in the overflow store 11 and pointers to these addresses are associated with the corresponding bits in the bitmap index shown in column 74 in FIG. 14.

In the example shown in FIG. 14 where the shadow store 9 is represented as having capacity to store five data blocks, the sixth block of data to change represented by the ninth row in column 70 must be stored in the overflow store 11. Thus, the old data block "Rrr" is stored at the first address 1 in the overflow store 11 and a corresponding index pointer [1] in the index shown in column 74 is associated with the corresponding bit in the bitmap so as to point to the first address location 1 within the overflow store 11. Similarly when the second block of data in the master is subsequently changed from "Qqq" to "BBB", then the old data is stored at address location 2 in the overflow store 11 and the index "[2]" is associated with the corresponding bit in the bitmap 73 pointing to that address location in the overflow store 11. Thus, when the point in time copy controller 4 wishes to assemble the point in time copy or virtual shadow shown in column 71, the point in time copy controller 4 checks the status of the bits in the bitmap, where the bit is 0, reads the data from the corresponding data block in the master store 6 and where the bit is 1 determines the location of the data in the shadow store 8 or overflow store 11 from the index associated with that bit and reads the data from that determined location.

When a user requests that a point in time copy created by the system shown in FIG. 12 including the overflow store 11 be restored to the master store, then the point in time copy controller 4 carries out the operations shown in FIG. 5*a* using, at S23 and S27 in FIG. 5*a*, the index data associated with the bit in the shadow bit map to determine the address in the shadow store 8 or overflow store 11 at which the data block to be copied back to the master store is located.

Such an overflow store 11 may be used in a point in time copy system having a plurality of master stores and shadow stores each using a reduced size shadow store. Separate overflow stores may be provided for separate master stores. As another possibility, a single overflow store may be provided that can be used by a plurality of master stores and associated bitmap stores with each bitmap being associated with an index in which the indices identify the addresses in the overflow store at which the required data is located. As another possibility, the shadow store may be omitted (that is the shadow store may have a capacity of zero), in which case any data in the master store that is to be overwritten will be stored in the overflow store 11 and, when the point in time copy controller 4 is requested to provide the point in time copy, the point in time copy controller 4 will determine the location of the data in the overflow store 73 from the index pointer in the index associated with the bitmap. Again, a single overflow store may be shared by a plurality of master stores and associated bitmap stores so that the size of the reduced size shadow store is effectively 0 and all shadow store data for a plurality of point in time copies is stored in a single overflow store shared by the different master stores.

The header information may be stored elsewhere in the mass storage device 22.

Figure 15A:
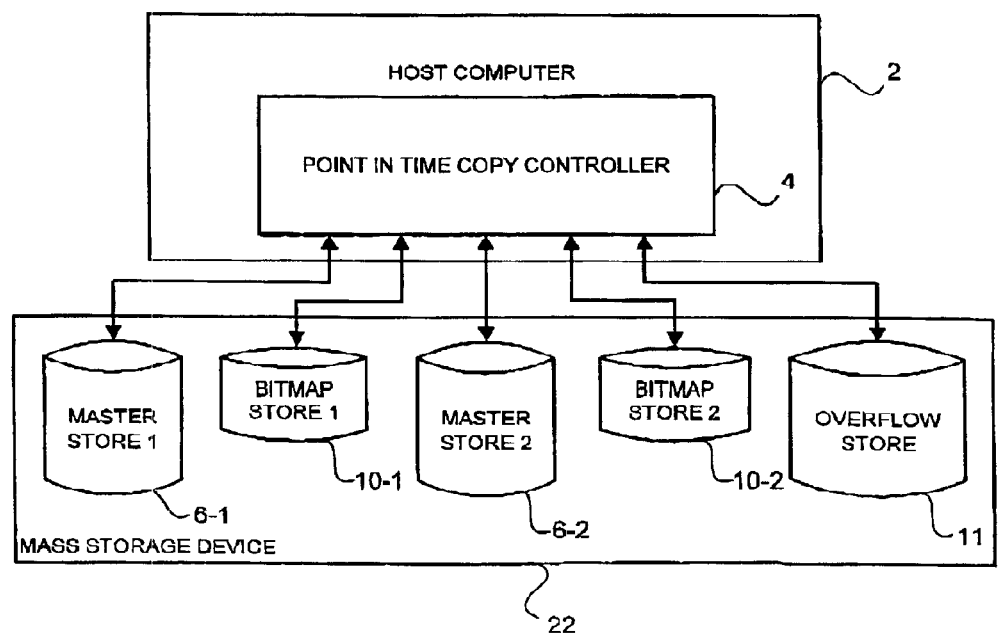
FIG. 15a shows another example of a point in time copy system embodying the present invention.
Figure 15B:
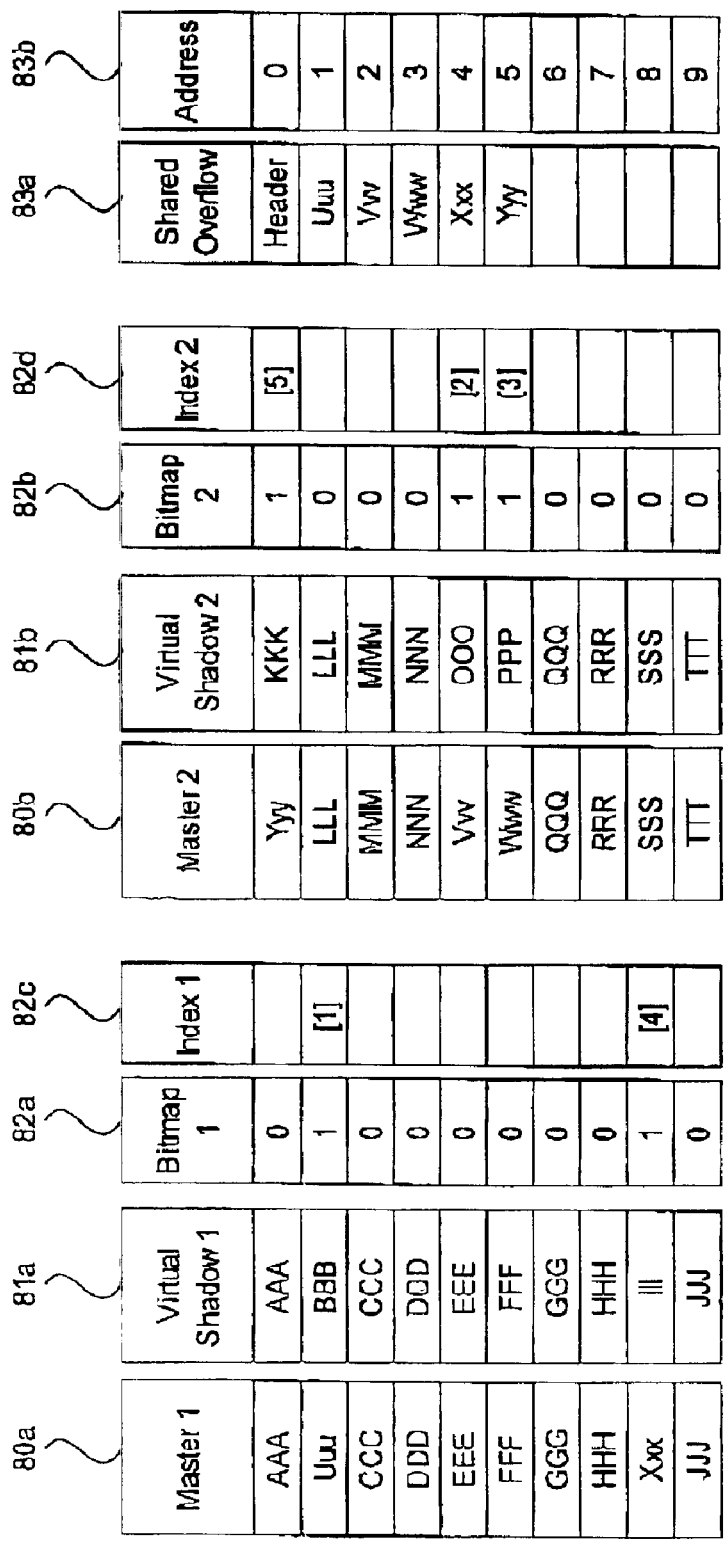

FIG. 15*a* illustrates an example of a point in time copy system in which two master stores 6-1 and 6-2 with associated bitmap stores 10-1 and 10-2 share a single overflow store 11 and no separate shadow store is provided. FIG. 15*b* shows a table (similar to the tables shown in FIGS. 4*e*, 4*f*, 8*a*, 8*b*, 13 and 14) providing an illustrative example of data that may be stored in the mass storage device 22 of this system. This table has columns 80*a* and 80*b* representing the data stored in the master stores 6-1 and 6-2, columns 81*a* and 81*b* representing the corresponding virtual shadow or point in time copies, columns 82*a* and 82*b* representing the corresponding shadow bitmaps stared in the bitmap stores 10-1 and 10-2 (each with an associated index represented by columns 82*c* and 82*d*) and a column 83*a* representing the data stored in the shared overflow store associated with a column 83*b* identifying the address locations in the shared overflow store.

As shown in FIG. 15*b*, the data in the second and ninth blocks of the master store 6-1 has changed since creation of the point in time copy while the data in the first, fifth and sixth data blocks in the other master store 6-2 has changed since the creation of the point in time copy. This is indicated in the shadow bitmaps shown in columns 82*a* and 82*b* by virtue of the fact that the corresponding bits are set to 1. Each of these bits is associated with an index or pointer pointing to the address in the shared overflow store at which the replaced data can be located. Accordingly, the point in time copy controller 4 can assemble the virtual shadow or point in time copy by accessing the data in the data blocks of the master store 6 that have not changed (those for which the shadow bitmap bit is 0) and reading the data from the address in the shared overflow store to which the index points for the data blocks for which the shadow bitmap bit is 1.

The point in time copy controller 4 can recover a master copy from the point in time copy by carrying out the operations described above with reference to FIG. 5*a*. In this case the point in time copy controller 4 determines the address in the shared overflow store at which a data block to be copied back to the master store at S23 or S27 is located from the index or pointer associated with the corresponding bit in the shadow bitmap.

Figure 16:
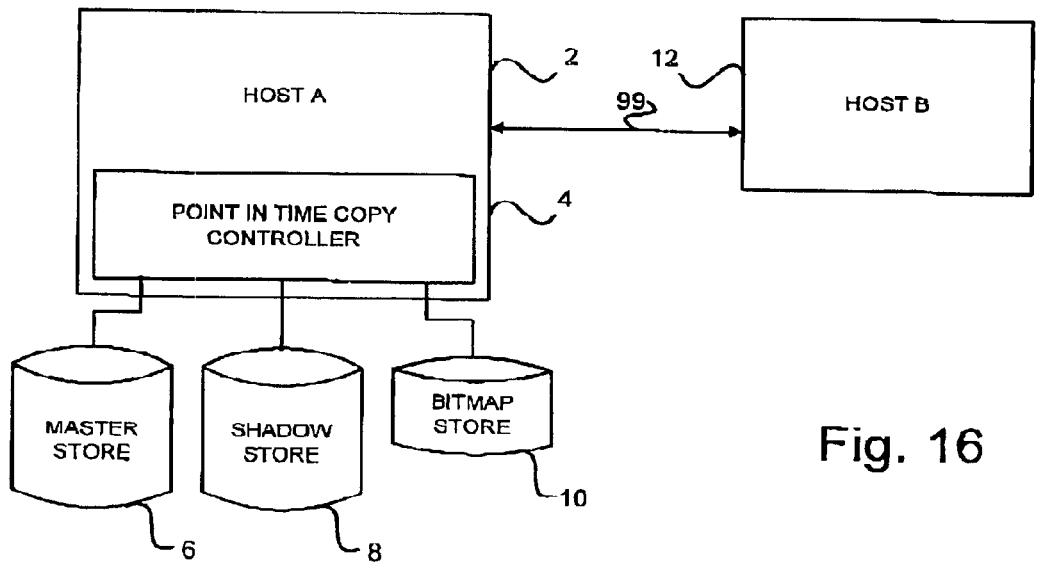
FIG. 16 shows a simplified functional block diagram for illustrating one way in which a further host computer may access a point in time copy system.

FIG. 16 shows one way in which a second host computer, host B, 12 may obtain a copy of a point in time copy for subsequent analysis or the storage of data from a point in time copy system which may have any of the formats described above. In this example, the second host computer 12 (host B) communicates with the first host computer 2 (that is host A) providing the point in time copy system via a communications link 99 to request access to a point in time copy. This communications link includes an emulator that causes the first host computer 2 to present itself to the second host computer 12 as a SCSI (Small Computer Systems Interface) hard disc drive. The second host computer 12 thus communicates with the first host computer 2 as if it were a disc drive from which data can be read and to which data can be written. The second host computer 12 may be a computer system having the functional components shown in FIG. 2 while the emulator may be the Sun Target Emulator supplied by Sun Microsystems Inc.

In this arrangement, when host B requests access to a point in time copy, then, if the independent mode was used to create the point in time copy, the point in time copy controller at host A accesses the point in time copy in the shadow store 8 and transfers a copy to host B via the communications link 99. If the dependent mode was used to create the point in time copy, the point in time copy controller at host A assembles the point in time copy by combining the unchanged data blocks in the master store with the replaced data blocks stored in the shadow store or overflow store, if provided.

This system enables host B to work on, and if required modify, a point in time copy provided by host A. If desired, the original or modified version of the point in time copy or shadow can be returned to the point in time copy system via the communications link 99 by the point in time copy controller 4 effectively treating the modified the point in time copy as a "master copy" and updating the subsidiary copy as described above with reference to FIG. 3. Upon user request, the master copy at the first host computer could be "restored", in this case modified, to agree with the returned point in time copy by the point in time copy controller 4 carrying out the operations shown in FIG. 5a once the point in time copy has been updated with the changes made at the second host computer 12.

Figure 17:
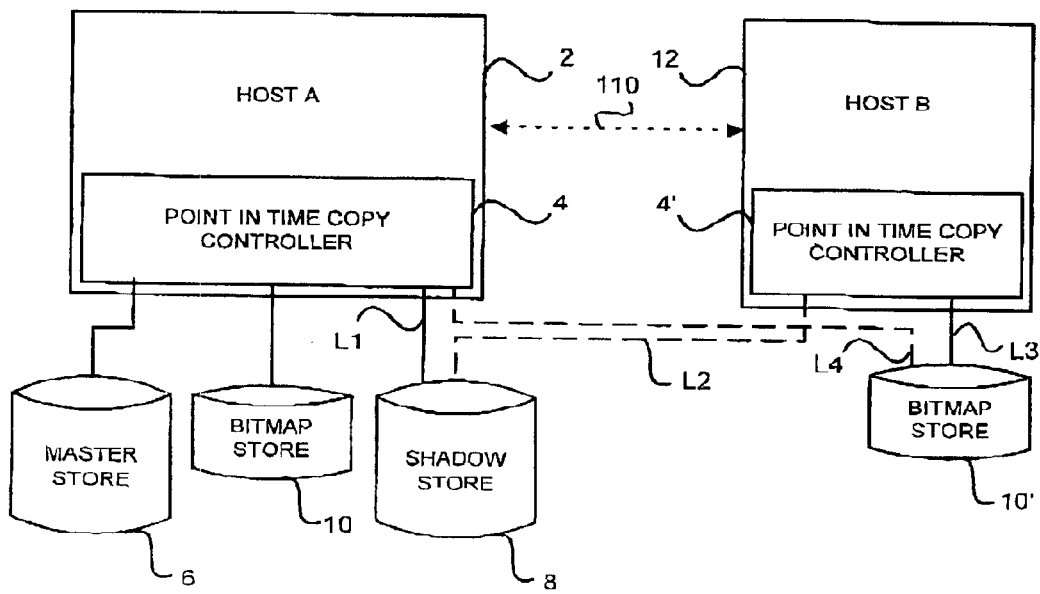
FIG. 17 shows a simplified block diagram for illustrating a point in time copy system that enables two host computers to share a shadow store.

It will be appreciated that this manner of exporting a point in time copy to host B ties up computing power in the point in time copying system provided by host A. FIG. 17 shows a functional block diagram similar to FIG. 16 to illustrate a way of enabling host B to access a point in time copy while avoiding the above problem.

In the system shown in FIG. 17, the shadow store is provided by a dual port device, for example a dual port hard disc drive that, in addition to a link L1 to host A, provides a selectable link L2 (shown in dashed lines) to host B that functions such that host A cannot access the shadow store (that is the link to host A is deselected) while host B is accessing the shadow store and vice versa. In this example, host B also provides a point in time copy system and has a point in time controller 4' and a bitmap store 10'. The bitmap store 10' is also a dual port device, for example a dual port disc drive, that in addition to a link L3 to the second host computer 12 provides a selectable link L4 (shown in dashed lines) to the first host computer 2 so that host A cannot access the bitmap store 10' while host B is accessing it and vice versa.

When a user at host B wishes to obtain a copy of a point in time copy stored at host A, host B acquires the link to the shadow store 8 no that the point in time copy controller 4' at host B can access the shadow store directly and can then perform analysis on, copy and/or modify the accessed point in time copy without having to obtain it via host A. The point in time copy controller 4' at host B records any data block changes by setting the corresponding bits in the bitmap stored in its bitmap store 10' to 1.

While host B has control of the shadow store, host A can continue to work and any changes to the data stored in the caster store will be recorded by its point in time controller 4 setting the appropriate bit in the bitmap in the bitmap store to 1 to indicate that that data block in the master store is not the same as the corresponding data block of the point in time copy. Host A must however wait for control of the shadow store 8 to be returned from host B before its point in time copy controller can make a now point in time copy.

When host A regains control of the dual port shadow store 8, host A also requests and obtains access to the dual port bitmap store 10' so that the point in time copy controller 4 of host A can combine the data from the shadow bitmap produced by the point in time copy controller 4' with the data from the shadow bitmap stored in bitmap store 10 to provide an accurate indication of how the point in time copy (which may have been modified by the point in time copy controller of host B) in the shadow store differs from the master data in the master store. This results in a bit in the bitmap stored in the bitmap store or host A being set to 1 if the corresponding data block of the copy exported to host B has been modified by host B of course, the bit will not be changed if it is already set at 1 because a change had occurred between the master and the point in time copy before the point in time copy was exported to host B. While host B has control over shadow store 8, the point in time copy controller at host A will continue to monitor when the data processor 23 overwrites data blocks in the master store 6 and changes to the master made by host A while host B has control over the shadow store will be recorded in the bitmap in the bitmap store 10. The only instance in which a bit in the bitmap in the bitmap store 10 will remain set at 0 to indicate that a data block in the master is the same as the corresponding data block in the point in time copy is when host B has not modified the corresponding data block in the exported point in time copy and host A has not modified the corresponding data block in the master store. When a data block has been overwritten in the master store and also in the point in time copy returned by host B, the overwritten data block will be lost. However, combining of the bitmaps provided by host A and host B enables a resynchronisation of the physical store (the disc volumes for example) when the next point in time copy is made at host A.

In the above example, access by host A to the bitmap store 10' is achieved by providing the bitmap store 10' as a dual port device. As another possibility, a transport mechanism using a standard file copy protocol may be provided between host A and host B as shown by the dashed line 110 in FIG. 17.

In an embodiment described above, the user may elect to create a second point in time copy in a second shadow store with a second bitmap so that two different point in time copier are made at different points in time. As those skilled in the art will appreciate, further shadow stores and bitmaps can be added to the system to enable still further multiple in time copies to be made. These devices may be accessed in sequential fashion.

In the above embodiments, the master store, shadow store and bitmap store were physically located on the same mass storage device 22. As those skilled in the art will appreciate, each store could comprise one or more physically separate storage devices, such as one or more discs. As another possibility, the entire mass storage device 22 may comprise a single physical storage device.

In the embodiments described above, the first address in the overflow store contains header information which points to the next free address and that identifies the store as an overflow store. As those skilled in the art will appreciate, this header information could be stored elsewhere in the computer storage system, for example, separately in the mass storage device 22 or working memory of the host computer.

Various embodiments described above can be supplied as complete computer storage systems with point in time copy functions. They can also be provided as software upgrades to existing computer storage systems to improve the functionality of their point in time copy capability. As mentioned above, the point in time copy functionality may be pre-stored in the computing apparatus or may be downloaded from a storage medium such as a floppy disc, CDROM or the like or supplied as a signal from another computing apparatus, for example over a network, or any combination of these.

In the above embodiments, the computer comprised a data processor 23 which is operable to retrieve data from the master store, to perform processing on the retrieved data, and to write data back to the master store. As those skilled in the art will appreciate, this data processor could be located external to the host computer. For example, the data processor could be located in another computer on the data network, and data retrieved from the master store could be transmitted to the data processor via the network interface. Data could also be received via the network interface and the data processor could then write the received data to the master store.

It will be appreciated that the significance of zero and one bits in the shadow and copy bitmaps may be changed. For example, a one in the shadow bitmap may represent that a data block is unchanged and a zero that the data block has been changed. As another possibility, a zero in the copy bitmap may indicate that the corresponding data block has not been copied and a one that the corresponding data block has been copied.

Although methods and systems consistent with the present invention have been described with reference to one or more embodiments thereof, those skilled in the art will know of various changes in form and detail which may be made without departing from the present invention as defined in the appended claims and their full scope of equivalents.

What is claimed is:

1. A system for providing a copy of data at a point in time, comprising:
    a data storage device, comprising
    a master store arranged to store blocks of data,
    a plurality of subsidiary stores each arranged to store point in time copy data comprising blocks of data copied from said master store at a particular point in time, and
    a plurality of bitmap stores each bitmap store being associated with a corresponding different one of the subsidiary stores and being configured to store data indicating when a data block of the master store differs from a corresponding data block stored in the associated subsidiary store; and
    a controller configured to generate point in time copies, the controller being arranged, in response to a request to generate a first point in time copy at a first point in time, to check, when a data block in the master store is about to be changed, whether the data in that data block at the first point in time has already been copied to a first one of the subsidiary stores, and, if not, to copy that data to the first subsidiary store,
    the controller further being arranged, in response to a request to generate a second point in time copy at a second point in time, to check, when a data block in the master store is about to be changed, whether the data in that data block at the second point in time has already been copied to a second one of the subsidiary stores, and, if not, to copy that data to the second subsidiary store,
    the controller also being arranged to maintain data indicating differences between the master store and each point in time copy by causing data to be stored in the associated bitmap store to indicate when a data block in the master store differs from a corresponding data block of the point in time copy.

2. A system according to claim 1, wherein the controller is arranged, in response to a request to generate a point in time copy at a point in time, also to check whether or not each block of data present in the master store at the point in time has been copied to the subsidiary store and to copy any of those blocks of data not already in the subsidiary store to the subsidiary store to generate the first point in time copy so that the subsidiary store contains a copy of each block of data in the master store.

3. A system according to claim 1, wherein the controller is arranged to overwrite a point in time copy in response to a user instruction.

4. A system according to claim 1, wherein the controller is arranged to allow a user to select whether or not the first point in time copy is overwritten with the second point in time copy.

5. A system according to claim 2, wherein the bitmap store is configured also to store data indicating whether or not each block of data present in the master store at a particular point in time has been copied to the associated subsidiary store, and the controller is arranged to check the data in the bitmap store to determine if the blocks of data need to be copied to the associated subsidiary store to generate the point in time copy.

6. A system for providing a copy of data at a point in time, comprising:
    a data storage device, comprising
    a plurality of master stores each arranged to store blocks of data,
    a plurality of subsidiary stores each associated with a corresponding one of the master stores and each arranged to store point in time copy data comprising blocks of data copied from said master stored for a point in time, and
    a plurality of bitmap stores each bitmap store being associated with a corresponding different one of master stores and being configured to store data indicating when a data block of the master store differs from a corresponding data block stored in the associated subsidiary store; and
    a controller configured to generate a point in time copy,
    the controller being arranged, in response to a request to generate a point in time copy at a point in time, to check, when a data block in a master store is about to be changed, whether the data in that data block for the associated point in time copy has already been copied to the associated subsidiary store, and, if not, to copy that data to the associated subsidiary store,
    the controller also being arranged to maintain data indicating differences between the master store and the point in time copy by causing data to be stored in the associated bitmap store to indicate when a data block in the master store differs from a corresponding data block of the point in time copy.

7. A system according to claim 6, wherein the controller is arranged, in response to a request to generate a point in time copy, also to check whether or not each block of data present in the corresponding master store at the point in time has been copied to the corresponding subsidiary store and to copy any of those blocks of data not already in the subsidiary store to that subsidiary store to cause each subsidiary store to contain a copy of each block of data in the corresponding master store.

8. A system according to claim 7, wherein the controller is arranged to generate the point in time copies for the different master stores for the same point in time.

9. A system according to claim 6, wherein the plurality of subsidiary stores are replaced by a shared overflow store arranged to store point in time copy data comprising blocks of data copied from each of said master stores at particular points in time, such that: each bitmap store being associated with a corresponding different one of the master stores and configured to store data indicating when a data block of a master store differs from a corresponding data block stored in the overflow store and to which blocks in the overflow store the blocks of data from each of said master stores have been copied, and the controller being arranged, in response to a request to generate a point in time copy at a point in time, to check, when a data block in the master store is about to be changed, whether the data in that data block for the point in time copy has already been copied to the overflow store, and, if not, to copy that data to the overflow store and to store in the associated bitmap data representing the address of the block in the overflow store to which the data was copied.

10. A system according to claim 9, wherein the controller is arranged, in response to a request to generate a point in time copy, also to check whether or not each block of data present in the master store at the point in time has been copied to the overflow store and to copy any of those blocks of data not already in the overflow store to the overflow store so that the overflow store contains a copy of each block of data.

11. A system for providing a copy of data at a point in time, comprising;
  a data storage device, comprising
  a master store arranged to store blocks of data,
  a subsidiary store arranged to store point in time copy data comprising blocks of data copied from said master store for the same particular point in time, wherein the master store is capable of storing more blocks of data than the subsidiary store, and
  a bitmap store associated with the master store and being configured to store data indicating when a data block of the master store differs from a corresponding data block stored in the subsidiary store and to which blocks in the subsidiary store the blocks of data from said master store have been copied;
  a controller configured to generate a point in time copy, the controller being arranged, in response to a request to generate a point in time copy at a point in time, to check, when a data block in the master store is about to be changed, whether the data in that data block for the point in time copy has already been copied to the subsidiary store, and, if not, to copy that data to the subsidiary store and to store in the bitmap store address data representing the address of the block in the subsidiary store to which the data was copied,
  the controller also being arranged to maintain data indicating differences between the master store and the point in time copy by causing data to be stored in the bitmap store to indicate when a data block in the master store differs from a corresponding data block of the point in time copy; and
  an overflow store arranged to store, when said subsidiary store is full, blocks of data copied from said master store for the particular point in time.

12. A system according to claim 11, wherein the controller is arranged, in response to a request to generate a point in time copy at a point in time, to check, when a data block in the master store is about to be changed, whether the data in that data block for the point in time copy has already been copied to one of the subsidiary store or the overflow store, and, if not, to copy that data to the subsidiary store, or if the subsidiary store is full to the overflow store, and to store in the bitmap store data representing the address of the block in the subsidiary or overflow store to which the data was copied.

13. A system for providing a copy of data at a point in time, comprising:
  a first computer processing device;
  a second computer processing device;
  a data storage device coupled to the first computer processing device and comprising a master store arranged to store blocks of data, a subsidiary store arranged to store point in time copy data comprising blocks of data copied from said master store at a particular point in time and a first bitmap store coupled to the first computer processing device via a first link, the first bitmap store configured to store data indicating when a data block of the master store differs from a corresponding data block stored in the associated subsidiary store;
  a selectable coupling selectably coupling the second computer processing device to the subsidiary store to enable the second computer processing device to access a point in time copy; and
  a second bitmap store coupled to the second computer processing device via a second link and configured to store data indicating when a data block of a point in time copy accessed by the second computer processing device has been modified, wherein when the second computer processing device is selectably coupled to the subsidiary store, the first computer processing device cannot access the subsidiary store.

14. A system according to claim 1, wherein the controller is arranged, in response to a request to restore a master copy from one of the first and second point in time copies, to identify from the bitmap store for that point in time copy any data block in the master store that differs from the corresponding data block in that point in time copy and to copy from the associated subsidiary store to the master store the or each identified data block to restore the point in time copy as a master copy in the master store.

15. A system according to claim 1, wherein each bitmap store comprises a data bitmap configured to store, for each data block of the master store, data indicating whether or not that data block differs from the corresponding data block of the associated point in time copy and a copy bitmap arranged to store copy data for each data block of the master store, the copy bitmap being configured such that a bit in the data bitmap indicating that a data block in the master store differs from the corresponding data block of the associated point in time copy would represent in the copy bitmap a copy bit indicating that the data block should be copied, and wherein the controller is arranged, in response to a request to restore a master copy from one of the first and second point in time copies, to copy the data in the associated data bitmap to the associated copy bitmap, to identify any data block associated with a copy bit and, for the or each identified data block, to copy the data block from the associated subsidiary store to the master store and to reset the copy bit after the data block has been copied back to the master store.

16. A system according to claim 2, wherein each bitmap store comprises a data bitmap configured to store, for each data block of the master store, data indicating whether or not that data block differs from the corresponding data block of the associated point in time copy and a copy bitmap configured to store copy data for each data block of the master store, and the controller is arranged, in response to a request to restore a master copy from one of the first and second point in time copies, to set each bit in the copy bitmap as a copy bit representing that the data block should be copied, to copy each data block in the associated subsidiary store to the master store, to reset a copy bit after the corresponding data block has been copied back to the master store and to determine that the one of the first and second point in time copies has been restored as a master copy in the master store when all the copy bits in the associated copy bitmap have been reset.

17. A system according to claim 2, wherein the controller is arranged, after a point in time copy has been created, to update the data in the bitmap store indicating differences between the master store and each subsidiary store each time a data block in the master store is overwritten after creation of a point in time copy in that subsidiary store and the controller is also configured, in response to a request to create a subsequent point in time copy, to determine from the data in the bitmap store indicating differences between the master store and the subsidiary store any data block in the master store that differs from the corresponding data block in that subsidiary store and to copy each such data block from the master store to that subsidiary store to create the subsequent point in time copy.

18. A system according to claim 6, wherein the controller is arranged, in response to a request to restore a master copy from a point in time copy, to identify from the bitmap store for the point in time copy any data block in the corresponding master store that differs from the corresponding data block in the point in time copy and to copy any such identified data block from the associated subsidiary store to the corresponding master store to restore a master copy in the master store.

19. A system according to claim 6, wherein each bitmap store comprises a data bitmap configured to store, for each data block of the master store, the data indicating whether or not that data block differs from the corresponding data block of the associated point in time copy and a copy bitmap configured to store copy data for each data block of the master store, the copy bitmap being configured such that a bit in the data bitmap indicating that a data block in the master store differs from the corresponding data block of the associated point in time copy would represent in the copy bitmap a copy bit indicating that the data block should be copied, and wherein the controller is arranged, in response to a request to restore a master copy from a point in time copy, to copy the data in the associated data bitmap to the associated copy bitmap, the controller also being arranged to copy from the associated subsidiary store to the master store any data block associated with such a copy bit, to reset a copy bit after the corresponding data block has been copied back to the master store and to determine that a master copy has been restored in the master store when all the copy bits in the associated copy bitmap have been reset.

20. A system according to claim 7, wherein each bitmap store comprises a data bitmap configured to store, for each data block of the master store, the data indicating whether or not that data block differs from the corresponding data block of the associated subsidiary store and a copy bitmap configured to store copy data for each data block of the master store, and the controller is arranged, in response to a request to restore a master copy from a point in time copy, to set each bit in the copy bitmap as a copy bit representing that the data block should be copied, to copy each data block in the associated subsidiary store to the master store, to reset a copy bit after the corresponding data block has been copied back to the master store and to determine that a master copy has been restored in the master store when all the copy bits in the associated copy bitmap have been reset.

21. A system according to claim 7, wherein the controller is arranged, after a point in time copy has been created, to update the data indicating differences between a master store and a corresponding subsidiary store each time a data block in the master store is overwritten after creation of a point in time copy using that subsidiary store and the controller is also configured, in response to a request to create a subsequent point in time copy, to determine from the data indicating differences between the master store and the subsidiary store any data block in the master store that differs from the corresponding data block in that subsidiary store and to copy each such data block from the master store to that subsidiary store to create the subsequent point in time copy.

22. A system according to claim 11, wherein the controller is arranged, in response to a request to restore a master copy from a point in time copy, to identify from the data stored in the bitmap store any data block in the master store that differs from the corresponding data block in the point in time copy, and, for each such identified data block, to determine from the bitmap store the address data of the data block in the subsidiary store and to copy the data block from the determined address in the subsidiary store to the master store to restore the point in time copy as a master copy in the master store.

23. A system according to claim 11, wherein the bitmap store comprises a data bitmap configured to store, for each data block or the master store, data indicating whether or not that data block differs from the corresponding data block of a point in time copy and a copy bitmap configured to store copy data for each data block of the master store such that a bit in the data bitmap indicating that a data block in the master store differs from the corresponding data block of the associated point in time copy would represent in the copy bitmap a copy bit indicating that the data block should be copied, and the controller is arranged, in response to a request to restore a master copy from a point in time copy, to copy the data in the data bitmap to the copy bitmap, to identify any data block associated with a copy bit and, for the or each such identified data block, to determine from the bitmap store the address data of the data block in the subsidiary store, to copy the data block from the determined address in the subsidiary store to the master store, and to reset the copy bit after the data block has bean copied back to the master store.

24. A system according to claim 2, wherein the controller is arranged to overwrite a point in time copy in response to a user instruction.

25. A system according to claim 2, wherein the controller is arranged to allow a user to select whether or not the first point in time copy is overwritten with the second point in time copy.

26. A system according to claim 7, wherein the controller is arranged to generate the point in time copies for the different master stores for the same point in time.

27. A system according to claim 7, wherein the plurality of subsidiary stores are replaced by a shared overflow store arranged to store point in time copy data comprising blocks of data copied from each of said master stores at particular points in time, such that:
  each bitmap store being associated with a corresponding different one of the master stores and configured to store data indicating when a data block of a master store differs from a corresponding data block stored in the overflow store and to which blocks in the overflow store the blocks of data from each of said master stores have been copied, and
  the controller being arranged, in response to a request to generate a point in time copy at a point in time, to check, when a data block in the master store is about to be changed, whether the data in that data block for the point in time copy has already been copied to the overflow store, and, if not, to copy that data to the overflow store and to store in the associated bitmap data representing the address of the block in the overflow store to which the data was copied.

28. A method of making a point in time copy using a computer processing system, the method comprising:

accessing a data storage device comprising a master store storing blocks of data, a plurality of subsidiary stores each arranged to store point in time copy data comprising blocks of data copied from said master store at a particular point in time and a plurality of bitmap stores each bitmap store being associated with a corresponding different one of the subsidiary stores and being arranged to store data indicating when a data block of the master store differs from a corresponding data block stored in the associated subsidiary store;

generating a first point in time copy at a first point in time by checking, when a data block in the master store is about to be changed, whether the data in that data block at the first point in time has already been copied to a first one of the subsidiary stores, and, if not, copying that data to the first subsidiary store;

generating a second point in time copy at a second point in time by checking, when a data block in the master store is about to be changed, whether the data in that data block at the second point in time has already been copied to a second one of the subsidiary stores, and, if not, copying that data to the second subsidiary store; and maintaining data indicating differences between the master store and each point in time copy by causing data to be stored in the associated bitmap store to indicate when a data block in the master store differs from a corresponding data block of the point in time copy.

29. A method according to claim 28, further comprising, in response to a request to generate a point in time copy at a point in time, also checking whether or not each block of data present in the master store at the point in time has been copied to the subsidiary store and copying any of those blocks of data not already in the subsidiary store to the subsidiary store to generate the first point in time copy go that the subsidiary store contains a copy of each block of data in the master store.

30. A method according to claim 28, comprising overwriting a point in time copy in response to a user instruction.

31. A method according to claim 28, comprising allowing a user to select whether or not the first point in time copy is overwritten with the second point in time copy.

32. A method according to claim 29, wherein the bitmap store is configured also to store data indicating whether or not each block of data present in the master store at a particular point in time has been copied to the associated subsidiary store, and the method comprises checking the data in the bitmap store to determine if the blocks of data need to be copied to the associated subsidiary store to generate the point in time copy.

33. A method of making a point in time copy using a computer processing system the method comprising:

accessing a data storage device comprising a plurality of master stores each storing blocks of data, a plurality of subsidiary stores each associated with a corresponding one of the master stores and each arranged to store point in time copy data comprising blocks of data copied from said master store for a point in time, and a plurality of bitmap stores each bitmap store being associated with a corresponding different one of the master stores and being configured to store data indicating when a data block of the master store differs from a corresponding data block stored in the associated subsidiary store;

generating a point in time copy at a point in time by checking, when a data block in a master store is about to be changed, whether the data in that data block for the associated point in time copy has already been copied to the associated subsidiary store, and, if not, copying that data to the associated subsidiary store; and maintaining data indicating differences between the master store and the point in time copy by causing data to be stored in the associated bitmap store to indicate when a data block in the master store differs from a corresponding data block of the point in time copy.

34. A method according to claim 33, which comprises also checking whether or not each block of data present in the corresponding master store at the point in time has been copied to the corresponding subsidiary store and copying any of those blocks of data not already in the subsidiary store to that subsidiary store, so that each subsidiary store contains a copy of each block of data in the corresponding master store.

35. A method system according to claim 33, which comprises generating the point in time copies for the different master stores for the same point in time.

36. A method according to claim 33, wherein the plurality of subsidiary stores are replaced by a shared overflow store arranged to store point in time copy data comprising blocks of data copied from each of said master stores at particular points in time, such that each bitmap store is associated with a corresponding different one of the master stores and is configured to store data indicating when a data block of a master store differs from a corresponding data block stored in the overflow store and to which blocks in the overflow store the blocks of data from each of said master stores have been copied, and the method further comprises checking, when a data block in the master store is about to be changed, whether the data in that data block for the point in time copy has already been copied to the overflow store, and, if not, copying that data to the overflow store and storing in the associated bitmap data representing the address of the block in the overflow store to which the data was copied.

37. A system according to claim 36, which comprises also checking whether or not each block of data present in the master store at the point in time has been copied to the overflow store and copying any of those blocks of data not already in the overflow store to the overflow store so that the overflow store contains a copy of each block of data.

38. A method of making a point in time copy using a computer processing system the method comprising:

accessing a data storage device comprising a master store storing blocks of data, a subsidiary store arranged to store point in time copy data comprising blocks of data copied from said master store for the same particular point in time, wherein the master store is capable of storing more blocks of data than the subsidiary store, and a bitmap store associated with the master store and being configured to store data indicating when a data block of the master store differs from a corresponding data block stored in the subsidiary store and to which blocks in the subsidiary store the blocks of data from said master store have been copied;

generating a point in time copy by checking, when a data block in the master store is about to be changed, whether the data in that data block for the point in time copy has already been copied to the subsidiary store, and, if not, copying that data to the subsidiary store and storing in the bitmap store data representing the address of the block in the subsidiary store to which the data was copied wherein the data storage device has an overflow store arranged to store, when said subsidiary store is full, blocks of data copied from said master store for the particular point in time; and maintaining data indicating differences between the master store and the point in time copy by causing data to be stored in the bitmap store to indicate when a data block in the master store differs from a corresponding data block of the point in time copy.

39. A method according to claim 38, wherein the method comprises checking, when a data block in the master store is about to be changed, whether the data in that data block for the point in time copy has already been copied to one of the subsidiary store or the overflow store, and, if not, copying that data to the subsidiary store, or if the subsidiary store is full to the overflow store, and storing in the bitmap store data representing the address of the block in the subsidiary or overflow store to which the data was copied.

40. A method of maintaining a point in time copy using a computer system comprising a first computer processing device and a second computer processing device, the method comprising:

the first computer processing device accessing a master store storing blocks of data, storing a point in time copy data comprising blocks of data copied from said master store at a particular point in time in a subsidiary store, and storing data indicating when a data block of the master store differs from a corresponding data block stored in the associated subsidiary store in a first bitmap store coupled to the first computer processing device via a first link; and the second computer processing device selectably coupling to the subsidiary store via a second link in place of the first computer processing device to access the point in time copy, and storing data indicating when a data block of a point in time copy has been modified in a second bitmap store coupled to the second computer processing device and configured to accessed by the second computer processing device.

41. A method according to claim 28, further comprising the computer processing system responding to a request to restore a master copy from one of the first and second point in time copies by identifying from the bitmap store for that point in time copy any data block in the master store that differs from the corresponding data block in that point in time copy and copying from the associated subsidiary store to the master store the or each identified data block to restore the point in time copy as a master copy in the master store.

42. A method according to claim 28, wherein the computer processing system accesses a data storage device in which each bitmap store comprises a data bitmap storing, for each data block of the master store, the data indicating whether or not that data block differs from the corresponding data block of the associated point in time copy and a copy bitmap arranged to store copy data for each data block of the master store, the copy bitmap being configured such that a bit in the data bitmap indicating that a data block in the master store differs from the corresponding data block of the associated point in time copy would represent in the copy bitmap a copy bit indicating that the data block should be copied, and the method further comprises the computer processing system responding to a request to restore a master copy from one of the first and second point in time copies by copying the data in the associated data bitmap to the associated copy bitmap, identifying any data block associated with a copy bit and, for the or each identified data block, copying the data block from the associated subsidiary store to the master store and resetting the copy bit after the data block has been copied back to the master store.

43. A method according to claim 29, wherein the computer processing system accesses a data storage device in which each bitmap store comprises a data bitmap storing, for each data block of the master store, the data indicating whether or not that data block differs from the corresponding data block of the associated point in time copy and a copy bitmap configured to store copy data for each data block of the master store, and the method further comprises the computer processing system responding to a request to restore a master copy from one of the first and second point in time copies by setting each bit in the copy bitmap as a copy bit representing that the data block should be copied, copying each data block in the associated subsidiary store to the master store, resetting a copy bit after the corresponding data block has been copied back to the master store and determining that the one of the first and second point in time copies has been restored as a master copy in the master store when all the copy bits in the associated copy bitmap have been reset.

44. A method according to claim 29, wherein the method further comprises the computer processing system, after a point in time copy has been created, updating the data in the bitmap store indicating differences between the master store and each subsidiary store each time a data block in the master store is overwritten after creation of a point in time copy in that subsidiary store and, in response to a request to create a subsequent point in time copy, determining from the data in the bitmap store indicating differences between the master store and the subsidiary store any data block in the master store that differs from the corresponding data block in that subsidiary store and copying each such data block from the master store to that subsidiary store to create the subsequent point in time copy.

45. A method according to claim 33, the method further comprises the computer processing system responding to a request to restore a master copy from a point in time copy by identifying from the bitmap store for the point in time copy any. data block in the corresponding master store that differs from the corresponding data block in the point in time copy and copying any such identified data block from the associated subsidiary store to the corresponding master store to restore a master copy in the master store.

46. A method according to claim 33, wherein the computer processing system accesses a data storage device in which each bitmap store comprises a data bitmap storing, for each data block of the master store, the data indicating whether or not that data block differs from the corresponding data block of the associated point in time copy and a copy bitmap configured to store copy data for each data block of the master store, the copy bitmap being configured such that a bit in the data bitmap indicating that a data block in the master store differs from the corresponding data block of the associated point in time copy would represent in the copy bitmap a copy bit indicating that the data block should be copied, and the method further comprises the computer processing system responding to a request to restore a master copy from a point in time copy by copying the data in the associated data bitmap to the associated copy bitmap, copying from the associated subsidiary store to the master store any data block associated with such a copy bit, and resetting a copy bit after the corresponding data block has been copied back to the master store.

47. A method according to claim 34, wherein the computer processing system accesses a data storage device in which each bitmap store comprises a data bitmap storing, for each data block of the master store, the data indicating whether or not that data block differs from the corresponding data block of the associated subsidiary store and a copy bitmap configured to store copy data for each data block of the master store, and the method further comprises the computer processing system responding to a request to restore a master copy from a point in time copy by setting each bit in the copy bitmap as a copy bit representing that the data block should be copied, copying each data block in the associated subsidiary store to the master store, resetting a copy bit after the corresponding data block has been copied back to the master store and determining that a master copy has been restored in the master store when all the copy bits in the associated copy bitmap have been reset.

48. A method according to claim 34, further comprising the computer processing system, after a point in time copy has been created, updating the data indicating differences between a master store and a corresponding subsidiary store each time a data block in the master store is overwritten after creation of a point in time copy using that subsidiary store and, in response to a request to create a subsequent point in time copy, determining from the data indicating differences between the master store and the subsidiary store any data block in the master store that differs from the corresponding data block in that subsidiary store and copying each such data block from the master store to that subsidiary store to create the subsequent point in time copy.

49. A method according to claim 38, further comprising the computer processing system responding to a request to restore a master copy from a point in time copy by identifying from the data stored in the bitmap store any data block in the master store that differs from the corresponding data block in the point in time copy, and, for each such identified data block, determining from the bitmap store the address data of the data block in the subsidiary store and copying the data block from the determined address in the subsidiary store to the master store to restore the point in time copy as a master copy in the master store.

50. A method according to claim 38, wherein the computer processing system accesses a data storage device in which the bitmap store comprises a data bitmap storing, for each data block of the master store, data indicating whether or not that data block differs from the corresponding data block of a point in time copy and a copy bitmap configured to store copy data for each data block of the master store such that a bit in the data bitmap indicating that a data block in the master store differs from the corresponding data block of the associated point in time copy would represent in the copy bitmap a copy bit indicating that the data block should be copied, and the method further comprises the computer processing system responding to a request to restore a master copy from a point in time copy by copying the data in the data bitmap to the copy bitmap, identifying any data block associated with a copy bit and, for the or each such identified data block, determining from the bitmap store the address data of the data block, copying the data block from the determined address in the subsidiary store to the master store, and resetting the copy bit after the data block has been copied back to the master store.

51. A method according to claim 29, comprising overwriting a point in time copy in response to a user instruction.

52. A method according to claim 29, comprising allowing a user to select whether or not the first point in time copy is overwritten with the second point in time copy.

53. A method system according to claim 34, which comprises generating the point in time copies for the different master stores for the same point in time.

54. A method according to claim 34, wherein the plurality of subsidiary stores are replaced by a shared overflow store arranged to store point in time copy data comprising blocks of data copied from each of said master stores at particular points in time, such that each bitmap store is associated with a corresponding different one of the master stores and is configured to store data indicating when a data block of a master store differs from a corresponding data block stored in the overflow store and to which blocks in the overflow store the blocks of data from each of said master stores have been copied, and the method further comprises checking, when a data block in the master store is about to be changed, whether the data in that data block for the point in time copy has already been copied to the overflow store, and, if not, copying that data to the overflow store and storing in the associated bitmap data representing the address of the block in the overflow store to which the data was copied.

55. A system according to claim 54, which comprises also checking whether or not each block of data present in the master store at the point in time has been copied to the overflow store and copying any of those blocks of data not already in the overflow store to the overflow store so that the overflow store contains a copy of each block of data.

56. A computer storage medium storing processor implementable instructions for programming a processor to carry out a method in accordance with claim 28.

57. A computer storage medium storing processor implementable instructions for programming a processor to carry out a method in accordance with claim 33.

58. A computer storage medium storing processor implementable instructions for programming a processor to carry out a method in accordance with claim 38.

59. A computer storage medium storing processor implementable instructions for programming a processor to carry out a method in accordance with claim 40.

60. A signal comprising processor implementable instructions for programming a processor to carry out a method in accordance with claim 28.

61. A signal comprising processor implementable instructions for programming a processor to carry out a method in accordance with claim 33.

62. A signal comprising processor implementable instructions for programming a processor to carry out a method in accordance with claim 38.

63. A signal comprising processor implementable instructions for programming a processor to carry out a method in accordance with claim 40.

64. A data storage device, comprising:
a master store arranged to store blocks of data;
a first subsidiary stores arranged to store first point in time copy data comprising blocks of data copied from said master store at a first point in time;
a second subsidiary stores arranged to store second point in time copy data comprising blocks of data copied from said master store at a second point in time; and
a plurality of bitmap stores each bitmap store being associated with a corresponding different one of the subsidiary stores and being configured to store data indicating when a data block of the master store differs from a corresponding data block stored in the associated subsidiary store.

65. A data storage device according to claim 64, wherein the bitmap store is configured also to store data indicating whether or not each block of data present in thee master store at a particular point in time has been copied to the associated subsidiary store.

* * * * *